US011490402B2

(12) United States Patent
Takeda et al.

(10) Patent No.: US 11,490,402 B2
(45) Date of Patent: Nov. 1, 2022

(54) POWER CONTROL BASED ON SEMI-STATIC DIRECTION FOR DUAL CONNECTIVITY

(71) Applicant: QUALCOMM Incorporated, San Diego, CA (US)

(72) Inventors: Kazuki Takeda, Minato-ku (JP); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 16/918,839

(22) Filed: Jul. 1, 2020

(65) Prior Publication Data
US 2021/0007122 A1    Jan. 7, 2021

Related U.S. Application Data

(60) Provisional application No. 62/870,880, filed on Jul. 5, 2019.

(51) Int. Cl.
*H04W 72/12* (2009.01)
*H04W 72/14* (2009.01)
(Continued)

(52) U.S. Cl.
CPC ......... *H04W 72/1268* (2013.01); *H04L 5/001* (2013.01); *H04W 52/34* (2013.01); *H04W 72/1289* (2013.01); *H04W 72/14* (2013.01)

(58) Field of Classification Search
CPC ............. H04W 72/1268; H04W 52/34; H04W 72/1289; H04W 72/14; H04W 52/367;
(Continued)

(56) References Cited

U.S. PATENT DOCUMENTS

2017/0303211 A1* 10/2017 Takeda ............... H04W 52/346
2017/0325174 A1* 11/2017 Dinan ................. H04W 52/146
2019/0191382 A1* 6/2019 Zhang ................ H04W 52/146

OTHER PUBLICATIONS

Intel Corporation: "Feature Lead Summary #2 For Uplink Power Control for Supporting NN-DC", 3GPP Draft, 3GPP TSG-RAN WG1 #97, R1-1907891, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 17, 2019 (May 17, 2019), XP051740152, 17 pages, Retrieved from the Internet: URL: http://www.3gpp.org/ftp/tsg%5Fran/WG1%5FRL1/TSGR1%5F97/Docs/R1%2D1907891%2Ezip. [retrieved on May 17, 2019] section 2.1, table 2 section 3.2.
(Continued)

*Primary Examiner* — Hardikkumar D Patel
(74) *Attorney, Agent, or Firm* — Holland & Hart LLP/Qualcomm Incorporated

(57) ABSTRACT

Methods, systems, and devices for wireless communications are described. A user equipment (UE) may identify a maximum transmission power for an uplink transmission on a first cell of a first cell group (CG) based on a direction of communications (e.g., uplink, downlink, or flexible) with a separate cell of a second CG during a same duration of the uplink transmission and within a same first frequency range, where the direction of communications is either an actual direction or an assumed direction. The UE may receive an uplink grant scheduling the uplink transmission during a symbol and within the first frequency range, determine the maximum transmission power for the UE based on the direction of communications for the separate cell during the symbol and within the first frequency range, and subsequently transmit the uplink transmission in accordance with the maximum transmission power.

30 Claims, 13 Drawing Sheets

(51) Int. Cl.
*H04L 5/00* (2006.01)
*H04W 52/34* (2009.01)
(58) Field of Classification Search
CPC .. H04W 52/243; H04W 52/146; H04L 5/001; H04L 5/0035; H04L 5/0044; H04L 5/0007
See application file for complete search history.

(56) References Cited

OTHER PUBLICATIONS

International Search Report and Written Opinion—PCT/US2020/040598—ISA/EPO—dated Oct. 12, 2020.
Qualcomm Incorporated: "Cross-Carrier Scheduling with Different Numerologies", 3GPP Draft, 3GPP TSG-RAN WG1 #96, R1-1903026, Cross-Carrier Scheduling with Different Numerologies, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600723, 12 pages, Retrieved from the Internet: URL: http://www.3gpp.org/ftp/tsg%5Fran/WG1%5FRL1/TSGR1%5F96/Docs/R1%2D1903026%2Ezip. [retrieved on Feb. 16, 2019] section 1 section 2.1 section 2.2.1 section 3.

* cited by examiner

POWER CONTROL BASED ON SEMI-STATIC DIRECTION FOR DUAL CONNECTIVITY

CROSS REFERENCE

The present application for patent claims the benefit of U.S. Provisional Patent Application No. 62/870,880 by TAKEDA et al., entitled "POWER CONTROL BASED ON SEMI-STATIC DIRECTION FOR DUAL CONNECTIVITY," filed Jul. 5, 2019, assigned to the assignee hereof, and expressly incorporated by reference herein.

BACKGROUND

The following relates generally to wireless communications, and more specifically to power control based on semi-static direction for dual connectivity (DC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may support a DC configuration that can include simultaneous communications with one or more base stations. Efficient techniques are desired for determining available transmission powers for the UE in the DC configuration.

SUMMARY

The described techniques relate to improved methods, systems, devices, and apparatuses that support power control based on semi-static direction for dual connectivity (DC). Generally, the described techniques provide for a user equipment (UE) to identify a maximum transmission power for an uplink transmission on a first cell based on a direction of communications (e.g., uplink, downlink, or flexible) with a separate cell during a same duration of the uplink transmission and within a same first frequency range, where the direction of communications is either an actual direction or an assumed direction. For example, the UE may be configured with more than one cell group (CG) (e.g., a first CG and a second CG as part of a DC configuration), with the first CG including the first cell operating in the first frequency range and a second cell operating in a second frequency range, and with the second CG including at least a third cell (e.g., the separate cell) operating in the first frequency range. Accordingly, the UE may receive an uplink grant scheduling the uplink transmission during a symbol and within the first frequency range, then determine the maximum transmission power for the UE based on the direction of communications (e.g., either actual or assumed) for the third cell during the symbol and within the first frequency range (e.g., and not within the second frequency range), and subsequently transmit the uplink transmission in accordance with the maximum transmission power.

In some cases, the UE may determine to use the actual direction of communications for the third cell when determining the maximum transmission power based on the received uplink grant. For example, the UE may receive an additional uplink grant scheduling an additional uplink transmission on the second cell within the second frequency range and may determine respective maximum transmission powers in each frequency range based on actual directions of communications of corresponding cells of the second CG (e.g., the third cell in the first frequency range and a fourth cell in the second frequency range). In some cases, the UE may jointly receive the uplink grant and the additional uplink grant on the first cell with a carrier indication field (CIF) indicating which component carrier (CC) each uplink grant is scheduling the respective uplink transmissions (e.g., on the different frequency ranges) and then may determine the respective maximum transmission powers in each frequency range based on actual directions of communications of corresponding cells of the second CG. Accordingly, for both cases, the UE may determine the actual direction based on a semi-static time domain duplexing (TDD) configuration (e.g., transmitted to the UE via radio resource control (RRC) signaling), a synchronization signal (SS)/physical broadcast channel (PBCH) block (SSB) measurement time configuration (SMTC) window, a downlink channel (e.g., physical downlink control channel (PDCCH)) monitoring occasion configuration, a downlink semi-persistent scheduling (SPS) configuration, medium access control (MAC) information, or a combination thereof.

Additionally or alternatively, the UE may determine to use an assumed direction (e.g., uplink or flexible direction) of communications for the third cell (e.g., and the fourth cell) when determining the maximum transmission power based on a configured cross-carrier scheduling across cells in the different frequency ranges. In some cases, the cross-carrier scheduling (e.g., with the uplink grant) may be received in a downlink control information (DCI) message (e.g., with a DCI format 0_1 that includes a CIF). For either the actual direction and the assumed direction, an uplink or flexible transmission direction for the direction of communications for the third cell may correspond to a first maximum transmission power, and a downlink transmission direction (e.g., for the actual direction) may correspond to a second maximum transmission power, where the first maximum transmission power is different (e.g., less than) the second maximum transmission power.

A method of wireless communications at a UE is described. The method may include identifying that the UE is configured with a first CG and a second CG, with the first CG having a first cell operating within a first frequency range and a second cell operating with a second frequency range, and with the second CG having at least a third cell operating within the first frequency range, receiving an uplink grant scheduling an uplink transmission on the first cell during a symbol and within the first frequency range, determining a maximum transmission power for the uplink transmission based on a direction of communications with the third cell during a duration of the symbol and within a frequency range that includes the first frequency range and is exclusive of the second frequency range, and transmitting the uplink transmission on the first cell of the first CG within the first frequency range in accordance with the maximum transmission power.

An apparatus for wireless communications at a UE is described. The apparatus may include a processor, memory coupled with the processor, and instructions stored in the memory. The instructions may be executable by the processor to cause the apparatus to identify that the UE is configured with a first CG and a second CG, with the first CG having a first cell operating within a first frequency range and a second cell operating with a second frequency range, and with the second CG having at least a third cell operating within the first frequency range, receive an uplink grant scheduling an uplink transmission on the first cell during a symbol and within the first frequency range, determine a maximum transmission power for the uplink transmission based on a direction of communications with the third cell during a duration of the symbol and within a frequency range that includes the first frequency range and is exclusive of the second frequency range, and transmit the uplink transmission on the first cell of the first CG within the first frequency range in accordance with the maximum transmission power.

Another apparatus for wireless communications at a UE is described. The apparatus may include means for identifying that the UE is configured with a first CG and a second CG, with the first CG having a first cell operating within a first frequency range and a second cell operating with a second frequency range, and with the second CG having at least a third cell operating within the first frequency range, receiving an uplink grant scheduling an uplink transmission on the first cell during a symbol and within the first frequency range, determining a maximum transmission power for the uplink transmission based on a direction of communications with the third cell during a duration of the symbol and within a frequency range that includes the first frequency range and is exclusive of the second frequency range, and transmitting the uplink transmission on the first cell of the first CG within the first frequency range in accordance with the maximum transmission power.

A non-transitory computer-readable medium storing code for wireless communications at a UE is described. The code may include instructions executable by a processor to identify that the UE is configured with a first CG and a second CG, with the first CG having a first cell operating within a first frequency range and a second cell operating with a second frequency range, and with the second CG having at least a third cell operating within the first frequency range, receive an uplink grant scheduling an uplink transmission on the first cell during a symbol and within the first frequency range, determine a maximum transmission power for the uplink transmission based on a direction of communications with the third cell during a duration of the symbol and within a frequency range that includes the first frequency range and is exclusive of the second frequency range, and transmit the uplink transmission on the first cell of the first CG within the first frequency range in accordance with the maximum transmission power.

In some examples of the method, apparatuses, and non-transitory computer-readable medium described herein, the direction may be either an actual direction or an assumed direction. In some examples of the method, apparatuses, and non-transitory computer-readable medium described herein, determining the maximum transmission power for the uplink transmission may include operations, features, means, or instructions for determining to use a first maximum transmission power when the actual direction of communications with the third cell within the first frequency range may be downlink, and determining to use a second maximum transmission power when the actual direction of communications with the third cell within the first frequency range may be uplink or flexible, where the second maximum transmission power may be different from the first maximum transmission power.

In some examples of the method, apparatuses, and non-transitory computer-readable medium described herein, the second maximum transmission power may be less than the first maximum transmission power.

In some examples of the method, apparatuses, and non-transitory computer-readable medium described herein, determining the maximum transmission power for the uplink transmission may include operations, features, means, or instructions for assuming that the direction of communications with the third cell within the first frequency range may be either uplink or flexible, and determining to use, as the maximum transmission power, a lesser of two selectable maximum transmission power values, based on the assumption.

Some examples of the method, apparatuses, and non-transitory computer-readable medium described herein may further include operations, features, means, or instructions for determining whether to use the actual direction or the assumed direction of communications with the third cell within the first frequency range in determining the transmission power for the uplink transmission.

Some examples of the method, apparatuses, and non-transitory computer-readable medium described herein may further include operations, features, means, or instructions for receiving an additional uplink grant scheduling an additional uplink transmission on the second cell within the second frequency range, and determining an additional transmission power for the additional uplink transmission based on a direction of communications with a fourth cell of the second CG within the second frequency range but not within the first frequency range.

In some examples of the method, apparatuses, and non-transitory computer-readable medium described herein, the uplink grant and the additional uplink grant may be received on the first cell and the second cell, respectively, and where the transmission power and the additional transmission power may be each determined based on the direction of communications within respective frequency ranges.

In some examples of the method, apparatuses, and non-transitory computer-readable medium described herein, the uplink grant and the additional uplink grant may be received jointly on the first cell and with a CIF to indicate which CC each of the uplink grant and the additional uplink grant pertain, and where the transmission power and the additional transmission power may be each determined based on the direction of communications within respective frequency ranges.

Some examples of the method, apparatuses, and non-transitory computer-readable medium described herein may further include operations, features, means, or instructions for identifying that cross-carrier scheduling across cells in different frequency ranges may be configured, such that the uplink grant may be received on a CC within the second frequency range, while the uplink transmission may be scheduled within the first frequency range, and determining to use, as the maximum transmission power, a lesser of two selectable maximum transmission power values, based on cross-carrier scheduling across cells in different frequency ranges being configured.

In some examples of the method, apparatuses, and non-transitory computer-readable medium described herein, the determination to use the lesser of the two selectable maximum transmission power values may be based on the assumed direction of communications with the third cell within the first frequency range.

In some examples of the method, apparatuses, and non-transitory computer-readable medium described herein, determining to use, as the maximum transmission power, the lesser of the two selectable maximum transmission power values further may include operations, features, means, or instructions for identifying that the uplink grant may be received via a DCI message, and determining to use the lesser of the two selectable maximum transmission power values as the maximum transmission power based on both the uplink grant being received via the DCI message and on cross-carrier scheduling across cells in different frequency ranges being configured.

In some examples of the method, apparatuses, and non-transitory computer-readable medium described herein, determining to use, as the maximum transmission power, the lesser of the two selectable maximum transmission power values further may include operations, features, means, or instructions for identifying that the uplink grant may be received via a DCI message of format 0_1 with a CIF, and determining to use the lesser of the two selectable maximum transmission power values as the maximum transmission power based on both the uplink grant being received via the DCI message having format 0_1 and the CIF and on cross-carrier scheduling across cells in different frequency ranges being configured.

Some examples of the method, apparatuses, and non-transitory computer-readable medium described herein may further include operations, features, means, or instructions for determining the actual direction based on a semi-static TDD configuration, a SMTC window, a downlink channel monitoring occasion configuration, a downlink SPS configuration, MAC information, or a combination thereof.

In some examples of the method, apparatuses, and non-transitory computer-readable medium described herein, the direction includes an uplink, downlink, or flexible transmission direction.

DETAILED DESCRIPTION

Figure 1:
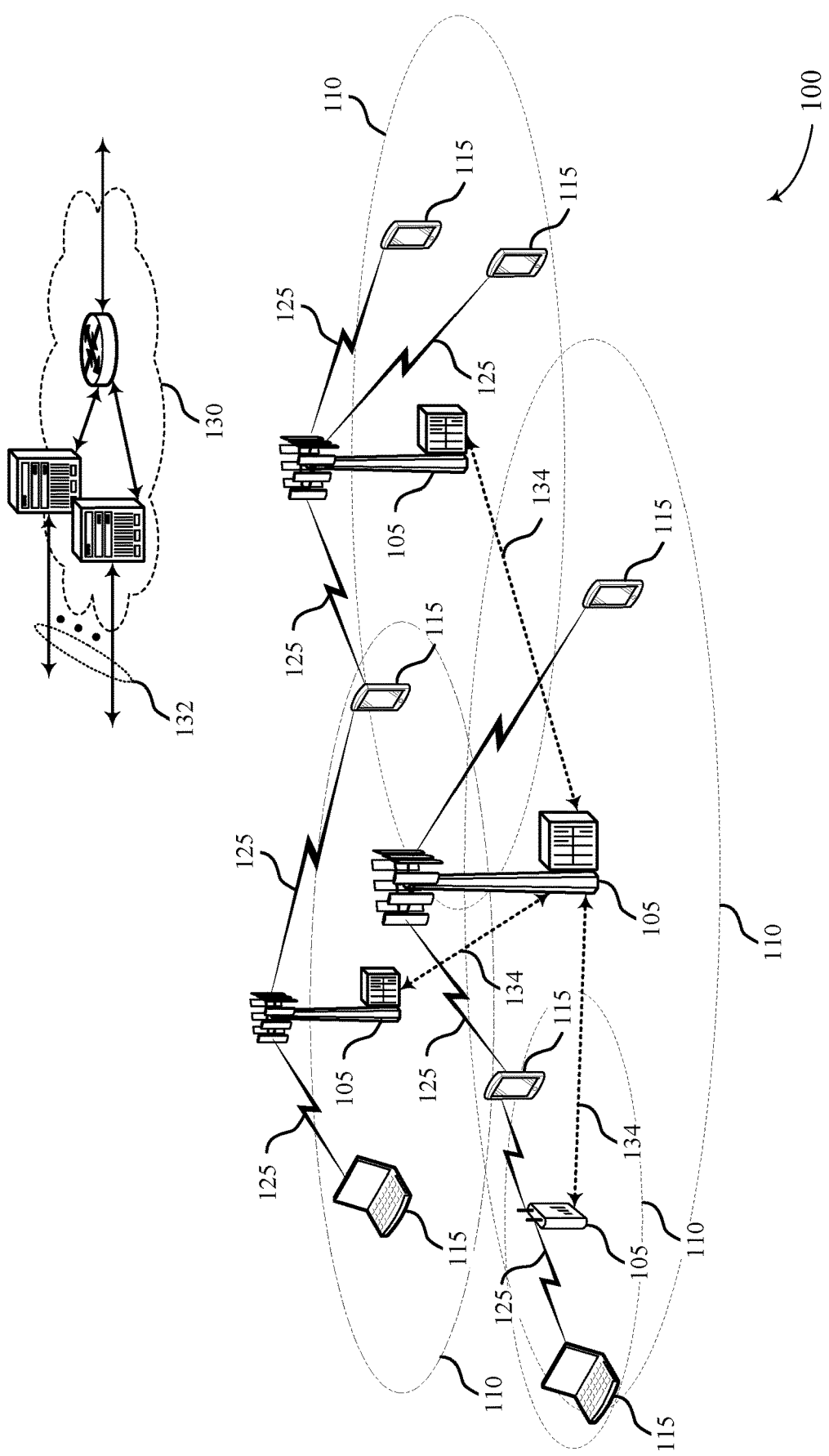
FIG. 1 illustrates an example of a system for wireless communications that supports power control based on semi-static direction for dual connectivity (DC) in accordance with aspects of the present disclosure.

In some wireless communications systems, a user equipment (UE) may support communications with more than one cell group (CG) simultaneously. These multiple CGs may be associated with one base station or with separate base stations, and the UE may communicate using the multiple CGs with the corresponding base station(s). In some cases, the UE may receive downlink messages on a first CG while simultaneously transmitting uplink messages on a second CG. In some cases, the UE may receive downlink messages on each CG at a same time, transmit uplink messages on each CG at a same time, or any combination of transmission direction (e.g., downlink, uplink, or flexible) for each CG at a given time. When transmitting uplink messages, the UE may also determine a transmission power for the uplink transmissions. In some examples, the UE may be configured with the more than one CG (e.g., as part of a dual connectivity (DC) configuration), where at least one CG includes at least one cell in a first frequency range (FR1) and one cell in a second frequency range (FR2). Accordingly, the UE may communicate with one or more base stations via the more than one CG in different transmission directions at the same time. When a UE is configured with more than one CG, the UE may be configured with more than one medium access control (MAC) entities, one MAC entity for each CG. In some cases, these communications via the more than one CG in the different transmission directions may include receiving downlink messages in one of the CGs, transmitting uplink messages in another of the CGs, or any combination of downlink and uplink messages across the CGs at a given time. When transmitting uplink messages, the UE may determine a maximum transmission power available to use for the uplink transmissions. In some cases, the UE may determine the maximum transmission power for an uplink transmission on a first cell based on transmission directions for other cells (e.g., or component carriers (CCs)) in the same CG and the other CGs. For example, an uplink or flexible transmission direction for the other cells may correspond to a first maximum transmission power, and a downlink transmission direction for the other cells may correspond to a second maximum transmission power, where the first maximum transmission power is different (e.g., less than) the second maximum transmission power. However, by summing powers across CGs, a total maximum power of the UE may be exceeded and/or different subcarrier spacings (SCSs) for the different cells of the CGs may affect the ability of determining the maximum transmission power at a given time.

As described herein, the UE may more efficiently identify a maximum transmission power for an uplink transmission on a first cell (e.g., of a first CG) based on a direction of communications (e.g., uplink, downlink, or flexible) with a separate cell (e.g., of a second CG) during a same duration of the uplink transmission and within FR1 (e.g., or any same frequency range) rather than across the CGs, where the direction of communications is either an actual direction or an assumed direction. For example, the UE may receive an uplink grant scheduling the uplink transmission during a symbol (e.g., or different length transmission time interval (TTI)) and within FR1, then may determine the maximum transmission power for the UE based on the direction of communications (e.g., either actual or assumed) for the separate cell during the symbol and within FR1 (e.g., and not within FR2), and subsequently may transmit the uplink transmission in accordance with the maximum transmission power. Accordingly, the maximum transmission power being based on the direction of communications may follow similar correspondence as described above (e.g., uplink/flexible corresponds to a first maximum transmission power and downlink corresponds to a second maximum transmission power, where the two maximum transmission powers are different).

In some cases, the UE may determine to use the actual direction of communications for the separate cell when determining the maximum transmission power based on the received uplink grant. For example, the UE may receive an additional uplink grant scheduling an additional uplink transmission on a second cell of the first CG within FR2 and may determine respective maximum transmission powers in each frequency range based on actual directions of communications of corresponding cells of the second CG (e.g., the separate cell in FR1 and an additional cell in FR2). In some cases, the UE may jointly receive the uplink grant and the additional uplink grant on the first cell with a carrier indication field (CIF) indicating which CC each uplink grant is scheduling the respective uplink transmissions (e.g., on the different frequency ranges) and then may determine the respective maximum transmission powers in each frequency range based on actual directions of communications of the corresponding cells of the second CG. Accordingly, for both cases, the UE may determine the actual direction based on a semi-static time domain duplexing (TDD) configuration (e.g., transmitted to the UE via radio resource control (RRC) signaling), a synchronization signal (SS)/physical broadcast channel (PBCH) block (SSB) measurement time configuration (SMTC) window, a downlink channel (e.g., physical downlink control channel (PDCCH)) monitoring occasion configuration, a downlink semi-persistent scheduling (SPS) configuration, MAC information, or a combination thereof.

Additionally or alternatively, the UE may determine to use an assumed direction of communications for the separate cell (e.g., and the additional cell) when determining the maximum transmission power based on a configured cross-carrier scheduling across cells in the different frequency ranges. In some cases, a UE may be configured with cross-carrier scheduling from one cell to another cell, where a downlink control information (DCI) message (e.g., with a DCI format 0_1 that includes a CIF) in the first cell schedules an uplink transmission in another cell. For example, the UE may assume the direction of communications for the separate cell is either uplink or flexible, thereby limiting the maximum transmission power for the uplink transmission in the first cell.

Aspects of the disclosure are initially described in the context of a wireless communications system. Additionally, aspects of the disclosure are illustrated through an additional wireless communications system, examples of direction checking processes, an assumed direction process, and a process flow. Aspects of the disclosure are further illustrated by and described with reference to apparatus diagrams, system diagrams, and flowcharts that relate to power control based on semi-static direction for DC.

FIG. 1 illustrates an example of a wireless communications system 100 that supports power control based on semi-static direction for DC in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internetof-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), TDD, or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation (e.g., DC). A UE 115 may be configured with multiple downlink CCs and one or more uplink CCs according to a CA configuration. CA may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a CA configuration or a DC configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and SCS may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, a UE 115 may support communications with more than one CG (e.g., two CGs) simultaneously. For example, the UE 115 may be configured with the more than one CG (e.g., as part of a DC configuration), where at least one CG includes at least one cell in a first frequency range (e.g., FR1) and one cell in a second frequency range (e.g., FR2). Accordingly, the UE 115 may communicate with one or more base stations 105 via the more than one CG in different transmission directions at the same time. In some cases, these communications via the more than one CG in the different transmission directions may include receiving downlink messages in one of the CGs, transmitting uplink messages in another of the CGs, or any combination of downlink and uplink messages across the CGs at a given time. When transmitting uplink messages, the UE 115 may determine a maximum transmission power available to use for the uplink transmissions.

The techniques described herein may be used to support uplink power control schemes to support synchronous as well as asynchronous NR-NR DC (NN-DC). Conventionally, the power control schemes may be used for NN-DC with one CG fully in FR1 and one CG fully in FR2, NR CA, Evolved Universal Terrestrial Radio Access (EUTRA) (e.g., LTE) and NR dual connectivity (EN/NE-DC), etc. In some cases, the NN-DC deployment may consider the case where all the serving cells of one CG are fully in FR1, while all the serving cells of the other CG are fully contained in FR2. Since there is no maximum power limit defined across the cells in FR1 and FR2, the UE may performs uplink power control independently across the two CGs. However, other scenarios may include deployments where both CGs contain only serving cells in FR1, both CGs contain only serving cells in FR2, both CGs contain serving cells in both FR1 and FR2, or one of the CGs contains serving cells in both FR1 and FR2. Hence, joint maximum power limitation may be considered.

Additionally or alternatively, for NR-CA, the uplink power control may be decided on a per occasion basis. At each occasion, the UE 115 may consider overlapping channels, their requested powers, and their priorities. If the sum power across all serving cells is beyond a maximum allowed power, the uplink power for some channels, based on the priority, may be scaled down. Hence, some uplink channels may experience phase discontinuity. However, it should be noted that whether the channels overlap or experience phase discontinuity may be controlled by the base station 105 (e.g., all serving cells are managed by a single base station 105). Alternatively, in a DC deployment, the base stations 105 may not be aware of each other's scheduling decisions; hence, uplink channels may be interrupted even without the associated base station 105 knowing about the interruption or has an option to avoid the interruption. Taking this key difference between CA and DC into account, an uplink power control for NN-DC may guarantee that the uplink transmissions for each CG will not be interrupted due to a transmission in another CG at all times.

In some cases, uplink power control schemes devised for EN-DC and NE-DC may rely on a fact that LTE has a longer processing delay than NR. Hence, for EN-DC (where LTE has a higher priority), an NR transmission power may be controlled to meet a maximum allowed power limit when colliding with an LTE channel. For NE-DC (where NR has a higher priority), an LTE maximum allowed power may be controlled semi-statically (e.g., via RRC signaling) depending on whether a collision can potentially take place or not; however, when a collision happens and the required power across the serving cells is larger than the joint power constraint, the power of the NR channels may be scaled down. In NN-DC, on the other hand, the UE 115 may have a comparable processing latency on both CGs in case both CGs are used for uplink data transmissions. In such a case, it may not be possible to assume that uplink transmissions in one CG can always be dynamically power controlled to ensure meeting the maximum power limitation.

Conventionally, for NR-CA, at each occasion for an uplink transmission, the UE 115 may scale down its power based on a priority rule to ensure $P_{max}$ is satisfied, where all cells are controlled by a same base station 105 (e.g., hence, interruptions are manageable/avoidable). However, for NN-DC, cells may not know about scheduling decisions for the other cells. Accordingly, following a conventional CA behavior with no modification may lead to interrupting the uplink transmission of one CG without letting the base station 105 know. Additionally or alternatively, for EN-DC, semi-static and dynamic power control schemes may be utilized, where under the dynamic scheme, the UE 115 may be configured with a $P_{LTE}$ and a $P_{NR}$. If $P_{LTE}+P_{NR}>P_{ENDC}$, the UE 115 may scale down its NR power when a collision happens (e.g., the secondary cell group (SCG) for NR has a lower priority and is faster; hence, the UE 115 can adapt its power based on the LTE decision). For NE-DC, NR may have a higher priority, so $P_{LTE}$ may be modified depending on whether a collision may happen or not. If $P_{NEDC}$ is not satisfied, NR power may then be scaled down. However, for NN-DC, the UE 115 may have a comparable processing latency on both CGs such that it may not be possible to always adapt a power for one CG based on a decision made by the other CG. Additionally or alternatively, conventionally for NN-DC, the UE 115 may use FR1+FR2 with independent power control across the CGs. However, for other NN-DC scenarios, the UE 115 may assume CGs with FR1+FR1 or FR2+FR2, such that power control decisions may be dependent across the CGs.

In some cases, under a semi-static power sharing scheme for NN-DC, a total allowed power across all the serving cells may be semi-statically split between the two CGs such that the total transmit power for the UE 115 is always below or equal to the total allowed transmit power. Hence, the UE 115 may guarantee that at no time, the uplink transmission in one CG may be interrupted by another uplink transmission (e.g., dynamically scheduled) in the other CG. As such, power scaling due to simultaneous transmissions in the other CG may not be needed, and each transmission's phase continuity can be preserved. Additionally, due to the absence of coordination across base stations 105 for NN-DC, with semi-static power sharing, the network operation may be predictable. Another important aspect to consider is that under a semi-static power sharing, uplink link adaptation may be performed efficiently. A base station 105 may decide an uplink modulation and coding scheme (MCS) based on its local information about the channel conditions and available power for the UE 115. With such information, uplink MCS may be set accordingly.

Additionally or alternatively, for uplink power control in a DC deployment, dynamic power sharing across the CGs may be utilized. Under this scheme, the total allowed power can be shared across the two CGs dynamically. As an example, each CG may be assigned a minimum reserved power to protect (e.g., a physical uplink control channel (PUCCH) carrying a HARQ acknowledgment (ACK) message). This minimum reserved power may be guaranteed for each CG and cannot be recycled by the other CG. As long as the uplink transmission power remains within this boundary (e.g., for the minimum reserved power), the transmission may not be impacted by a concurrent transmission in the other CG. However, if the base station 105 decides to request for a larger amount of power, the larger amount of power may not be guaranteed whether the transmission remains uninterrupted. As an example, a first physical uplink shared channel (PUSCH) (e.g., PUSCH A) may be scheduled with an uplink power, $P_A$, that is greater than a minimum reserved power for a CG 2 ($P_{res,2}$) (e.g., $P_A>P_{res,2}$). Another uplink transmission in a second PUSCH (e.g., a PUSCH B) with a higher priority may then be triggered in the other CG and may be requested to be sent with an uplink power, $P_B$, that is greater than a minimum reserved power for a CG 1 ($P_{res,1}$) (e.g., $P_B>P_{res,1}$) such that $P_A+P_B>P_{tot}$, where $P_{tot}$ may represent a total transmission power for the UE 115. In such a case, the power of the first PUSCH may need to be scaled down in the middle of the transmission. Any power re-scaling in the middle of the transmission may cause phase discontinuity (i.e., a demodulation reference signal (DMRS) and data symbols may be out of phase). Accordingly, the uplink transmission may not be decoded correctly or successfully.

As another example, the minimum reserved power may be sufficient for the transmission of a PUCCH carrying HARQ-ACK. However, the base station 105 may schedule a PUSCH overlapping with the PUCCH. In such a case, the HARQ-ACK may be multiplexed on the PUSCH. In some cases, the required power for the PUSCH carrying the HARQ-ACK may exceed the minimum reserved power. Since allocating a power above the minimum reserved power increases the risk of experiencing phase discontinuity, the HARQ-ACK reliability may be impacted. Accordingly, for dynamic power sharing, the network operation may not be predictable, where the interruptions are not under the full control of the scheduling base station 105 and cannot be avoided or planned. Hence, dynamic power sharing schemes for NN-DC may cause issues.

Additionally, asynchronous DC may be supportable with an architecture that has distinct hardware blocks mappable to the two CGs. For example, the two hardware blocks may be used for asynchronous DC that are clearly separable (i.e., there is no cross-CG HARQ dependency, no cross-CG maximum data rate sharing, no cross-CG channel state information (CSI) triggering, etc.). Accordingly, in the asynchronous DC mode, no pre-existing demand to have a fast interface across the blocks carrying dynamic information may be included.

In some cases, a practical scheme for uplink power control for allowing a base station 105 to make scheduling decisions independently may be desired for NN-DC. Satisfying this condition may be desirable due to the fact that the base stations 105 are not necessarily aware of scheduling decisions for other base stations 105 (e.g., a difference between CA and DC.) Under certain conditions, each base station 105 may make scheduling decisions independently while being certain that uplink transmissions from a UE 115 are not interrupted unless controlled by the same base station 105. From the network side to allow for predictable network operation for NN-DC, a UE 115 may be configured with a first set of maximum allowed powers for each CG such that a sum of a power for a first CG ($P_{NR1}$) and a power for a second CG ($P_{NR2}$) is less than or equal to a total power for the UE 115 operating in NN-DC ($P_{NN}$) (e.g., $P_{NR1}$+$P_{NR2} \leq P_{NN}$). Additionally, for synchronous deployments, the UE 115 may be configured with a with a second set of maximum allowed powers for each CG (e.g., synchronous powers) such that a sum of a power for the first CG ($P'_{NR1}$) and a power for the second CG ($P'_{NR2}$) can be equal to $P_{NN}$ (e.g., $P'_{NR1}+P'_{NR2} <=> P_{NN}$).

From the UE side, in synchronous DC, for an uplink transmission in CG1 (e.g., a first CG), the UE 115 may check the semi-statically configured direction of overlapping symbols of all serving cells of CG2 (e.g., a second CG). If the direction of all the symbols is downlink, then the UE 115 may be certain that there will be no overlapping uplink transmission on the other CG. Hence, the UE 115 may choose a maximum power associated with the serving group from a first set of maximum transmission powers (e.g., set 1). Otherwise, if at least one symbol of any of the serving cells of the other CG is configured as uplink or flexible (e.g., can be used for uplink or downlink as indicated by the base station 105, up to UE implementation, etc.), then the UE 115 may select a maximum power from a second set of maximum transmission powers (e.g., set 2). In some cases, the second set of maximum transmission powers may be smaller than the first set of maximum transmission powers. Additionally or alternatively, for asynchronous DC, the UE 115 may use a maximum allowed transmission power per CG and may manage uplink transmission within each CG similar to conventional CA techniques (e.g., scaling down uplink transmission powers based on priority rules to ensure a $P_{max}$ is satisfied).

As an example, for a first PUSCH in CG2 where the direction of all overlapping symbols of serving cells in CG1 are set to downlink, the UE 115 may be certain that the first PUSCH does not collide with any uplink channel on CG1. Thus, the UE 115 may determine the uplink transmission power for the first PUSCH can be up to $P_{NR2}'$ for CG2 as described above. Alternatively, for a second PUSCH in CG2 where the direction of some symbols in a CC of CG1 are set to flexible, the UE 115 may determine that a collision could potentially take place. Thus, the UE 115 may determine the uplink transmission power for the second PUSCH can be up to $P_{NR2}$.

For setting a maximum power per CG, the UE 115 may rely on semi-static configurations of the other serving cell in the synchronous DC and does not need any information about the other CG in the asynchronous DC. Thus, a tight interaction between the two serving cells at the UE side may not be required. From the point of view of the base station 105, the scheduling decisions and power settings may be similar to NR CA (i.e., collisions and a resulting power scaling/dropping of the uplink channel in each group is performed by the associated base station 105). Additionally, this scheme may provide sufficient flexibility for the network to balance a priority of two CGs by appropriately setting maximum powers in each CG. However, by setting maximum powers in each CG, a maximum power of the UE 115 may be exceeded based on the maximum powers being identified independently of each other.

Wireless communications system 100 may support efficient techniques for a UE 115 to identify a maximum transmission power for an uplink transmission on a first cell of a first CG based on a direction of communications (e.g., uplink, downlink, or flexible) with a separate cell of a second CG during a same duration of the uplink transmission and within a same first frequency range, where the direction of communications is either an actual direction or an assumed direction. For example, the UE 115 may receive an uplink grant scheduling the uplink transmission during a symbol (e.g., or a different duration TTI) and within the first frequency range, then determine the maximum transmission power for the UE 115 based on the direction of communications (e.g., either actual or assumed) for the separate cell during the symbol and within the first frequency range (e.g., and not within the second frequency range), and subsequently transmit the uplink transmission in accordance with the maximum transmission power. In some cases, the UE may determine to use the actual direction of communications for the separate cell when determining the maximum transmission power based on the received uplink grant (e.g., receiving two uplink grants or a jointly received uplink grant). Additionally or alternatively, the UE may determine to use an assumed direction of communications for the separate cell (e.g., and the additional cell) when determining the maximum transmission power based on a configured cross-carrier scheduling across cells in the different frequency ranges.

Figure 2:
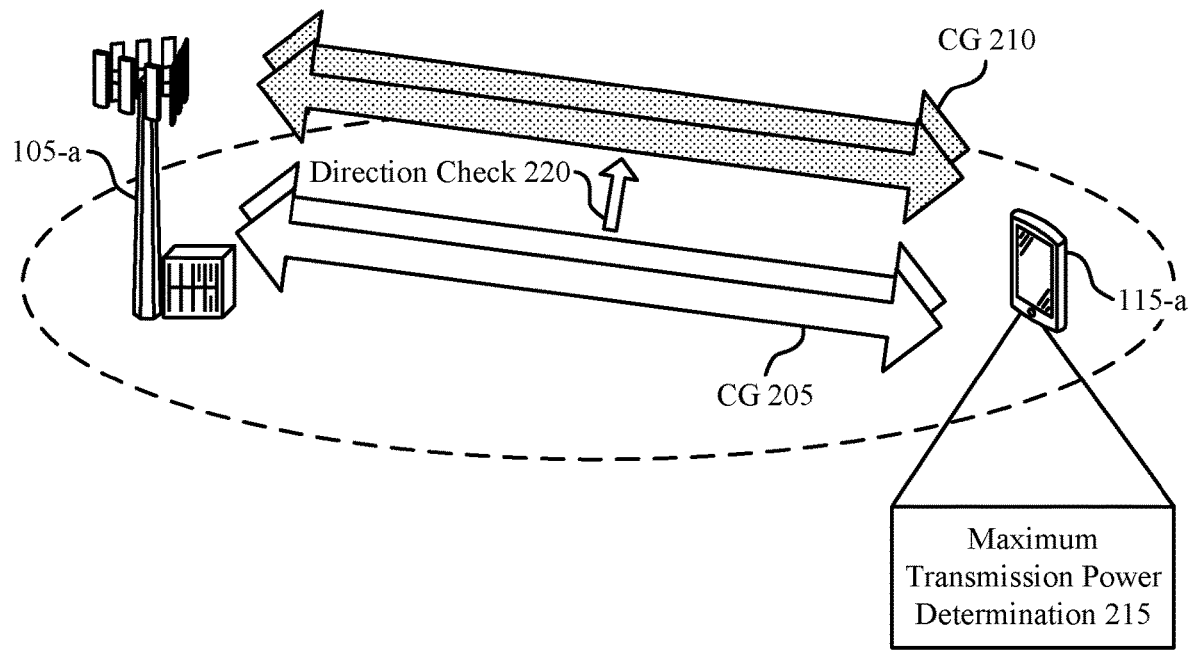
FIG. 2 illustrates an example of a wireless communications system that supports power control based on semi-static direction for DC in accordance with aspects of the present disclosure.

FIG. 2 illustrates an example of a wireless communications system 200 that supports power control based on semi-static direction for DC in accordance with aspects of the present disclosure. In some examples, wireless communications system 200 may implement aspects of wireless communications system 100. Wireless communications system 200 may include a base station 105-*a* and a UE 115-*a*, which may be examples of base stations 105 and UEs 115, respectively, as described above with reference to FIG. 1

As described herein, UE 115-*a* may support DC (e.g., NR-DC) and be configured with more than one CG, with a first CG 205 having a first cell (e.g., first CC) operating within a first frequency range (e.g., FR1) and a second cell (e.g., second CC) operating with a second frequency range (e.g., FR2), and with a second CG 210 having at least a third cell operating within the first frequency range. Accordingly, UE 115-*a* may communicate with base station 105-*a* on both first CG 205 and second CG 210 simultaneously. Additionally or alternatively, although not shown, UE 115-*a* may communicate with base station 105-*a* on first CG 205 (e.g., base station 105-*a* is a master eNB (MeNB) and first CG 205 is a master CG (MCG) and with a second base station 105 on second CG 210 (e.g., the second base station 105 is a secondary eNB (SeNB) and second CG 210 is a secondary CG (SCG)).

In some cases, UE 115-*a* may receive an uplink grant (e.g., from base station 105-*a*) on the first cell of first CG 205 that schedules an uplink message for UE 115-*a* to transmit on the first cell during a TTI within the first frequency range occurring after the uplink grant is received. Accordingly, UE 115-*a* may then perform a maximum transmission power determination 215 to determine a maximum transmission power for transmitting the uplink message based on a direction of communications with the third cell of second CG 210 during the TTI for the uplink message transmission and within the first frequency range. For example, the communications for the third cell of second CG 210 may occur within a frequency range (e.g., a frequency range that is limited with respect to the bandwidth and/or frequency spectrum) that includes the first frequency range and is exclusive of the second frequency range. For example, the frequency range for communications for the third cell of second CG 210 may include a portion or all of the first frequency range. Additionally, the direction of communications may include either an actual direction of communications for the third cell during the TTI and within the first frequency range or an assumed direction of communications for the third cell during the TTI and within the first frequency range.

For example, for NR-DC with one or both CGs including serving cell in the first frequency range and the second frequency range, UE 115-*a* may determine a maximum available power of a CG for a frequency range (e.g., maximum transmission power) based on a semi-static direction (e.g., actual direction) for serving cells (e.g., the third cell) in the same frequency range where the scheduled cell is included (e.g., and a semi-static direction for serving cells in the other frequency range is not taken into account). That is, a transmit power may be calculated independently for each frequency range, where transmission directions in the other frequency range(s) are not taken into account. If the semi-static direction for serving cells in the same frequency range includes a downlink designation, UE 115-*a* may use a maximum transmission power (e.g., a first transmission power) up to a total transmit power for UE 115-*a* per frequency range. Alternatively, if the semi-static direction for serving cells in the same frequency range includes either an uplink or flexible (e.g., can be used for either uplink or downlink communications) designation, UE 115-*a* may limit the maximum transmission power (e.g., a second transmission power different than the first transmission power, where the second transmission power is less than the first transmission power) for transmitting the uplink message (e.g., up to 50% of a total transmit power for UE 115-*a* per frequency range).

In some cases, UE 115-*a* may determine to identify the actual or semi-static direction using a direction check 220 for determining the maximum available power based on also receiving a second uplink grant in the second cell of first CG 205 within the second frequency range. Additionally, the second uplink grant may schedule a second uplink message to be transmitted in a subsequent TTI on the second cell within the second frequency range after receiving the second uplink grant. Accordingly, UE 115-*a* may similarly determine a second maximum available power for transmitting the second uplink message based on an actual direction (e.g., semi-static) direction of other serving cells within the second frequency range during the subsequent TTI. Additionally or alternatively, UE 115-*a* may receive the uplink grant and the second uplink grant jointly on the first cell, where the joint uplink grants include a CIF that indicates both the first and second cells for transmitting the respective uplink messages, and UE 115-*a* may determine respective maximum available powers for transmitting each uplink message in each frequency range based on the actual directions of the other serving cells in the corresponding frequency ranges.

For both cases, UE 115-*a* may determine the semi-static direction of the other serving cells in each frequency range based on a semi-static TDD configuration (e.g., indicated via RRC signaling from base station 105-*a*). For example, base station 105-*a* may configure different uplink, downlink, and flexible durations for UE 115-*a* for each cell in each CG, where UE 115-*a* uses the configurations to identify the semi-static (e.g., actual) directions of the other serving cells. Additionally or alternatively, UE 115-*a* may determine the semi-static directions based on an SMTC window, PDCCH monitoring occasions (e.g., configured via RRC signaling), downlink SPS (e.g., except for an initial uplink occasion after receiving an activation DCI for the SPS), or a combination thereof. In some cases, the determination of the semi-static direction for direction check 220 may be extended to be based on MAC information (e.g., time alignment timer (TAT) expiration, discontinuous reception (DRX) period, etc.). Accordingly, based on the semi-static (e.g., actual) direction of the other serving cells (e.g., downlink or uplink/flexible), UE 115-*a* may use up to a maximum available power as described above (e.g., up to the first maximum power, the second maximum power, etc.).

Additionally or alternatively, for NR-DC with one or both CGs (e.g., first CG 205 and second CG 210) including serving cells in the first frequency range and the second frequency range, if cross-carrier scheduling in different frequency ranges is configured to a cell of a CG (e.g., the first cell of first CG 205), UE 115-*a* may determine a maximum available power of a CG for a frequency range based on an assumption that there is an uplink or flexible duration (e.g., symbol, TTI, etc.) in the other CG. That is, UE 115-*a* may not check a semi-static direction of communications for the other serving cells in the same frequency range and use the assumed direction (e.g., uplink/flexible) for determining the maximum available power, thereby limiting the transmission power of the CG (e.g., up to 50% of the total transmit power for UE 115-*a* per frequency range). For example, when cross-carrier scheduling is configured for UE 115-*a* for the NR-DC, UE 115-*a* may not check the semi-static direction of serving cells in the other CG. By using the assumed direction, UE 115-*a* may reduce complexity for identifying the actual direction and reduce processing power of UE 115-*a*. In some cases, the cross-carrier scheduling may be carried by a DCI from the scheduling cell (e.g., base station 105-*a*). For example, the DCI may include a DCI format 0_1 that includes a CIF in the scheduling cell.

Subsequently, after performing maximum transmission power determination 215 (e.g., using direction check 220 to identify the actual direction of the other serving cells or using an assumed direction), UE 115-*a* may transmit the uplink message to base station 105-*a* at the determined maximum available power(s).

Figure 3A:
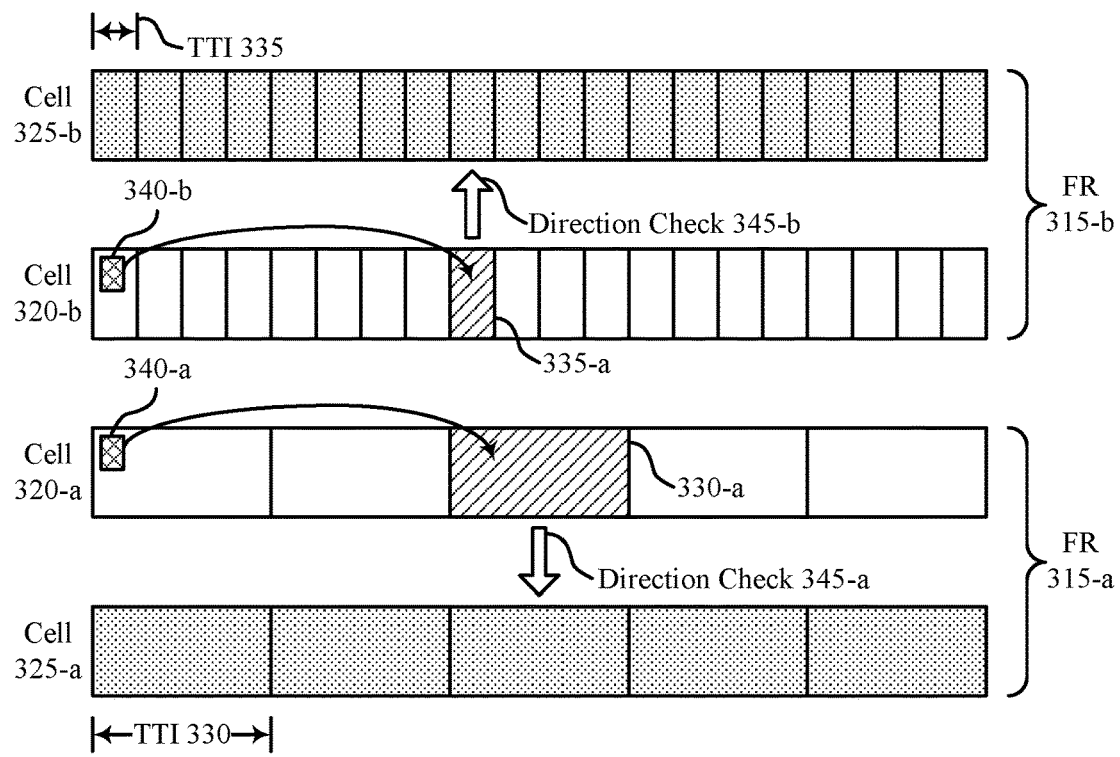
FIGS. 3A and 3B illustrate examples of direction checking processes that support power control based on semi-static direction for DC in accordance with aspects of the present disclosure.
Figure 3B:
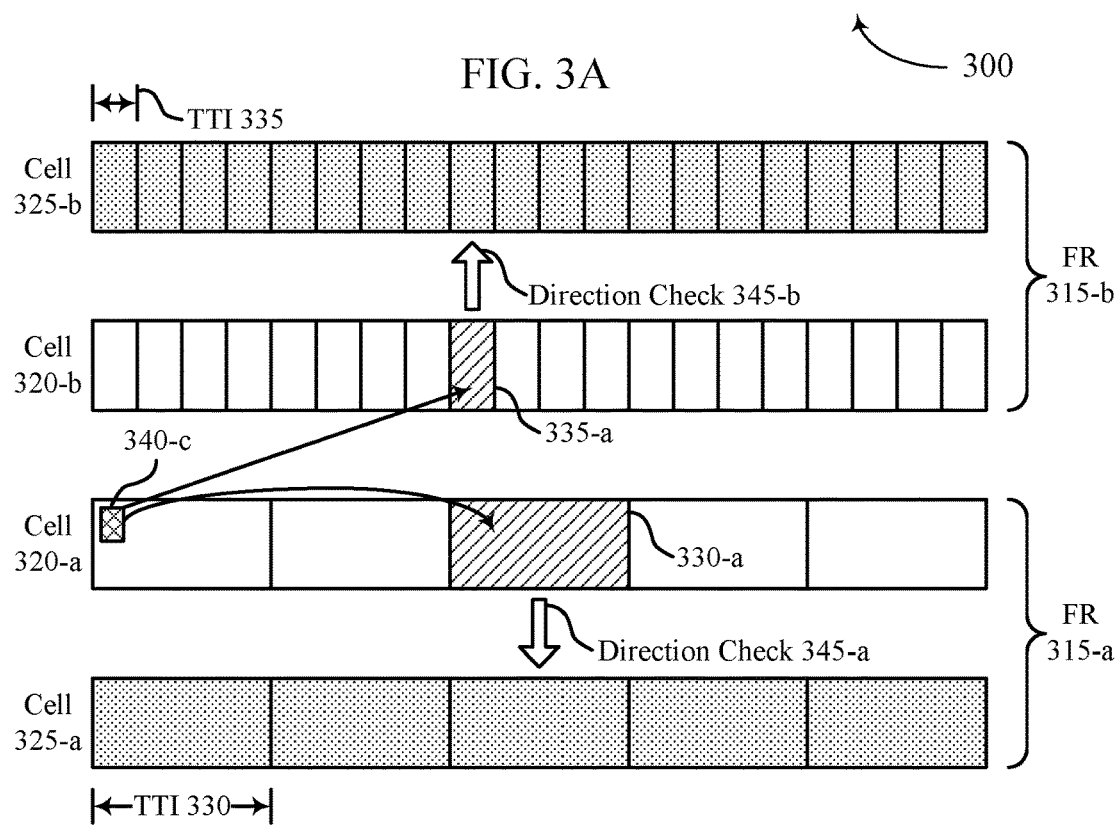

FIGS. 3A and 3B illustrate examples of direction checking processes 300 and 301 that support power control based on semi-static direction for DC in accordance with aspects of the present disclosure. In some examples, direction checking processes 300 and 301 may implement aspects of wireless communications systems 100 and/or 200. A UE 115 may perform direction checking processes 300 and/or 301 to determine a maximum available power for transmitting an uplink message for different in different cells for different CGs.

As described above, the UE 115 may support a DC configuration that includes a first CG 305 (e.g., MCG) and a second CG 310 (e.g., SCG), where first CG 305 includes a first cell 320-*a* in a first frequency range (FR) 315-*a* and a second cell 320-*b* in a second FR 315-*b* and second CG 310 includes a third cell 325-*a* in first FR 315-*a* and a fourth cell 325-*b* in second FR 315-*b*. As shown, each FR 315 may include different SCSs, such that communications for first cell 320-*a* and third cell 325-*a* in first FR 315-*a* are split into durations of a TTI 330 and communications for second cell 320-*b* and fourth cell 325-*b* in second FR 315-*b* are split into durations of a TTI 335. Accordingly, the UE 115 may receive an uplink grant 340 in a first TTI of one or more cells that schedules an uplink message to be transmitted in a subsequent TTI, where the UE 115 performs a direction check 345 to identify a transmission direction for other serving cells in the same FR 315 as the subsequent TTI. Based on this direction check 345, the UE 115 may determine a maximum available power for transmitting the uplink message as described above with reference to FIG. 2 (e.g., up to a full available power for the UE 115 per FR 315 if the transmission direction is downlink, up to 50% of a full available power for the UE 115 per FR 315 if the transmission direction is uplink/flexible, etc.).

As shown in direction checking process 300, the UE 115 may receive a first uplink grant 340-*a* in a first TTI 330 of first cell 320-*a* in first FR 315-*a* and a second uplink grant 340-*b* in a first TTI 335 of second cell 320-*b* in second FR 315-*b*. First uplink grant 340-*a* may schedule a first uplink message to be transmitted by the UE 115 in a subsequent TTI 330-*a* of first cell 320-*a* in first FR 315-*a*, and second uplink grant 340-*b* may schedule a second uplink message to be transmitted by the UE 115 in a second subsequent TTI 335-*a* of second cell 320-*b* in second FR 315-*b*. Based on receiving both first uplink grant 340-*a* and second uplink grant 340-*b* separately, the UE 115 may determine to perform a direction check 345 in each FR 315 for identifying an actual direction (e.g., semi-static direction) of communications in other serving cells of each FR 315. For example, the UE 115 may perform a first direction check 345-*a* on a TTI 330 of third cell 325-*a* in first FR 315-*a* that corresponds to subsequent TTI 330-*a* of first cell 320-*a* that is used for the first uplink message transmission. Additionally, the UE 115 may perform a second direction check 345-*b* on a TTI 335 of fourth cell 325-*a* in second FR 315-*b* that corresponds to subsequent TTI 335-*a* of second cell 320-*b* that is used for the second uplink message transmission. The UE 115 may then determine a first maximum available power for the first uplink message transmission in subsequent TTI 330-*a* based on first direction check 345-*a* and a second maximum available power for the second uplink message transmission in second subsequent TTI 335-*a* based on second direction check 345-*b*. Accordingly, the UE 115 may transmit the first uplink message and the second uplink message according to the first maximum available power and the second maximum available power, respectively.

Additionally or alternatively, as shown in direction checking process 301, the UE 115 may jointly receive the first uplink grant and the second uplink grant in a joint uplink grant 340-*c* of the first TTI 330 of first cell 320-*a* in first FR 315-*a*. Accordingly, joint uplink grant 340-*c* may schedule both the first uplink message to be transmitted by the UE 115 in subsequent TTI 330-*a* of first cell 320-*a* in first FR 315-*a* and the second uplink message to be transmitted by the UE 115 in second subsequent TTI 335-*a* of second cell 320-*b* in second FR 315-*b*. In some cases, joint uplink grant 340-*c* may include a CIF that indicates in which cell the uplink messages are to be transmitted (e.g., or CCs). Additionally, the first uplink message and/or the second uplink message may be dynamically scheduled within joint uplink grant 340-*c* (e.g., or an additional uplink grant, PDCCH, etc.). Subsequently, the UE 115 may then perform first direction check 345-*a* and second direction check 345-*b* as described above to identify the corresponding transmission directions for determining the respective maximum available powers in each FR 315.

As described above, for both direction checking processes 300 and 301, the UE 115 may determine the actual (e.g., semi-static) transmission directions of communications in other serving cells of each FR 315 based on semi-static TDD configuration, a SMTC window, a PDCCH monitoring occasion configuration (e.g., configured via RRC signaling), a downlink SPS configuration (e.g., except for an initial uplink occasion after receiving an activation DCI for activating the downlink SPS configuration), MAC information (e.g., TAT expiration, DRX period, etc.), or a combination thereof.

Figure 4:
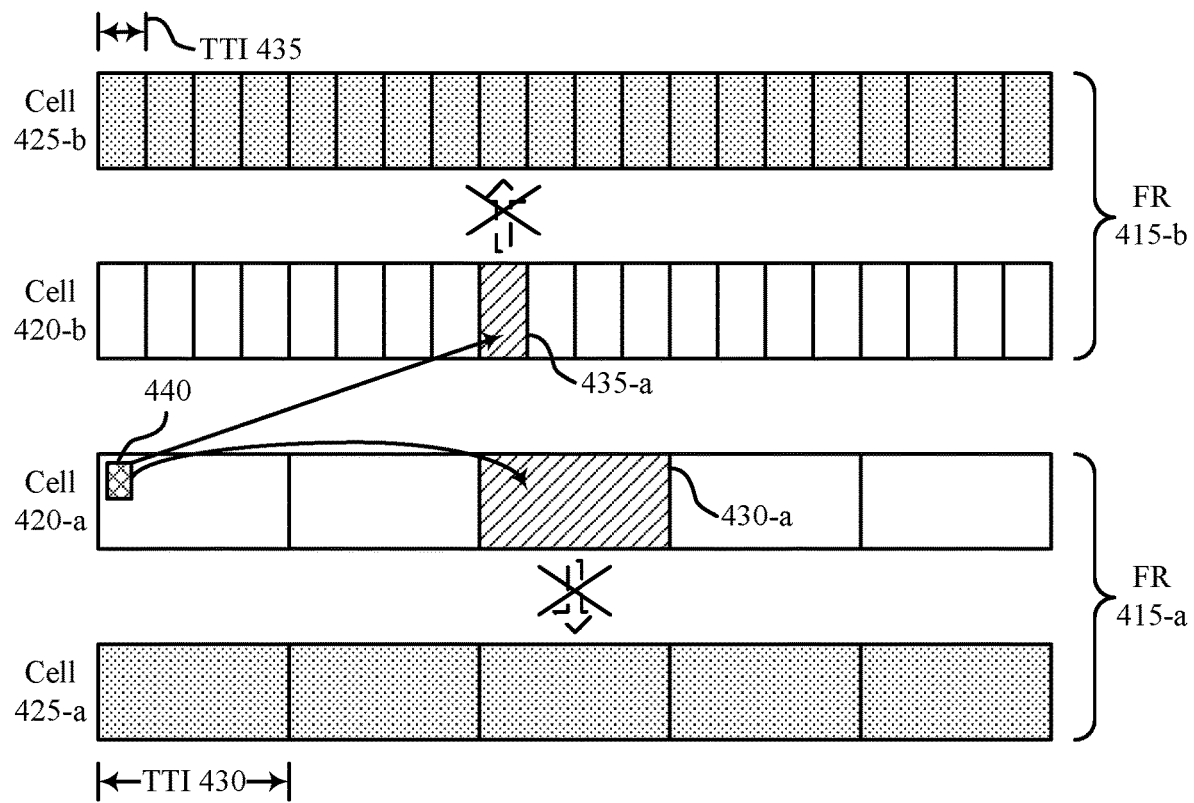
FIG. 4 illustrates an example of an assumed direction process that supports power control based on semi-static direction for DC in accordance with aspects of the present disclosure.

FIG. 4 illustrates an example of an assumed direction process 400 that supports power control for DC in accordance with aspects of the present disclosure. In some examples, assumed direction process 400 may implement aspects of wireless communications systems 100 and/or 200. A UE 115 may perform assumed direction process 400 to determine a maximum available power for transmitting an uplink message for different in different cells for different CGs.

As described above, the UE 115 may support a DC configuration that includes a first CG 405 (e.g., MCG) and a second CG 410 (e.g., SCG), where first CG 405 includes a first cell 420-*a* in a first FR 415-*a* and a second cell 420-*b* in a second FR 415-*b* and second CG 410 includes a third cell 425-*a* in first FR 415-*a* and a fourth cell 425-*b* in second FR 415-*b*. As shown, each FR 415 may include different SCSs, such that communications for first cell 420-*a* and third cell 425-*a* in first FR 415-*a* are split into durations of a TTI 430 and communications for second cell 420-*b* and fourth cell 425-*b* in second FR 415-*b* are split into durations of a TTI 435. Accordingly, the UE 115 may receive an uplink grant 440 in a first TTI of one or more cells that schedules an uplink message to be transmitted in a subsequent TTI.

However, alternative to the direction checking processes as described above with reference to FIG. 3, the UE 115 may not be required to check the direction to identify a transmission direction for other serving cells in the same FR 415 as the subsequent TTI and, instead, may use an assumed direction for the transmission direction of the other serving cells in the same FR 415. For example, the UE 115 may assume the other serving cells may include an uplink or flexible (e.g., can be used for either uplink or downlink communications as signaled by a base station 105, as determined by the UE 115, etc.) transmission designation, limiting a maximum available power for the UE 115 to use for the uplink message transmission (e.g., up to 50% of a full available power for the UE 115 per FR 415).

As shown in assumed direction process 400, the UE 115 may jointly receive a first uplink grant and a second uplink grant in a joint uplink grant 440 of the first TTI 430 of first cell 420-*a* in first FR 415-*a*. Accordingly, joint uplink grant 440-*c* may schedule both a first uplink message to be transmitted by the UE 115 in a subsequent TTI 430-*a* of first cell 420-*a* in first FR 415-*a* and the second uplink message to be transmitted by the UE 115 in second subsequent TTI 435-*a* of second cell 420-*b* in second FR 415-*b*. In some cases, joint uplink grant 440-*c* may include a CIF that indicates in which cell the uplink messages are to be transmitted (e.g., or CCs). Additionally, the first uplink message and/or the second uplink message may be dynamically scheduled within joint uplink grant 440-*c* (e.g., or an additional uplink grant, PDCCH, etc.). However, when cross-carrier scheduling (e.g., via joint uplink grant 440-*c*) is configured for the UE 115 across FRs 415 (e.g., for NR-DC) in first cell 420-*a* of first CG 405, the UE 115 may not check the semi-static direction of serving cells in second CG 410.

Additionally, in some cases, for NR-DC with one or both CGs including serving cells in first FR 415-*a* (e.g., FR1) and second FR 415-*b* (e.g., FR2), if the cross-carrier scheduling across cells in different FRs 415 is configured to a cell of a CG, a maximum available power of a CG for a FR 415 may be based on the assumption that there is an uplink or flexible transmission direction in the other CG for an uplink transmission scheduled by a DCI from the scheduling cell (e.g., in joint uplink grant 440). For an uplink transmission scheduled by a cell not configured with cross-carrier scheduling across FRs 415, the UE 115 may check a semi-static (e.g., actual) direction of serving cells in the FR 415 and determine a maximum available power of a CG for a FR 415 as described above with reference to FIG. 3. Additionally or alternatively, in some cases, for NR-DC with one or both CGs including serving cells in first FR 415-*a* (e.g., FR1) and second FR 415-*b* (e.g., FR2), if the cross-carrier scheduling across cells in different FRs 415 is configured to a cell of a CG, a maximum available power of a CG for a FR 415 may be based on the assumption that there is an uplink or flexible transmission direction in the other CG for an uplink transmission scheduled by a DCI format 0_1 with a CIF field in the scheduling cell (e.g., in joint uplink grant 440). For an uplink transmission scheduled by a DCI without a CIF field (e.g., DCI format 0_0), the UE 115 may check a semi-static (e.g., actual) direction of serving cells in the FR 415 and determine a maximum available power of a CG for a FR 415 as described above with reference to FIG. 3.

Figure 5:
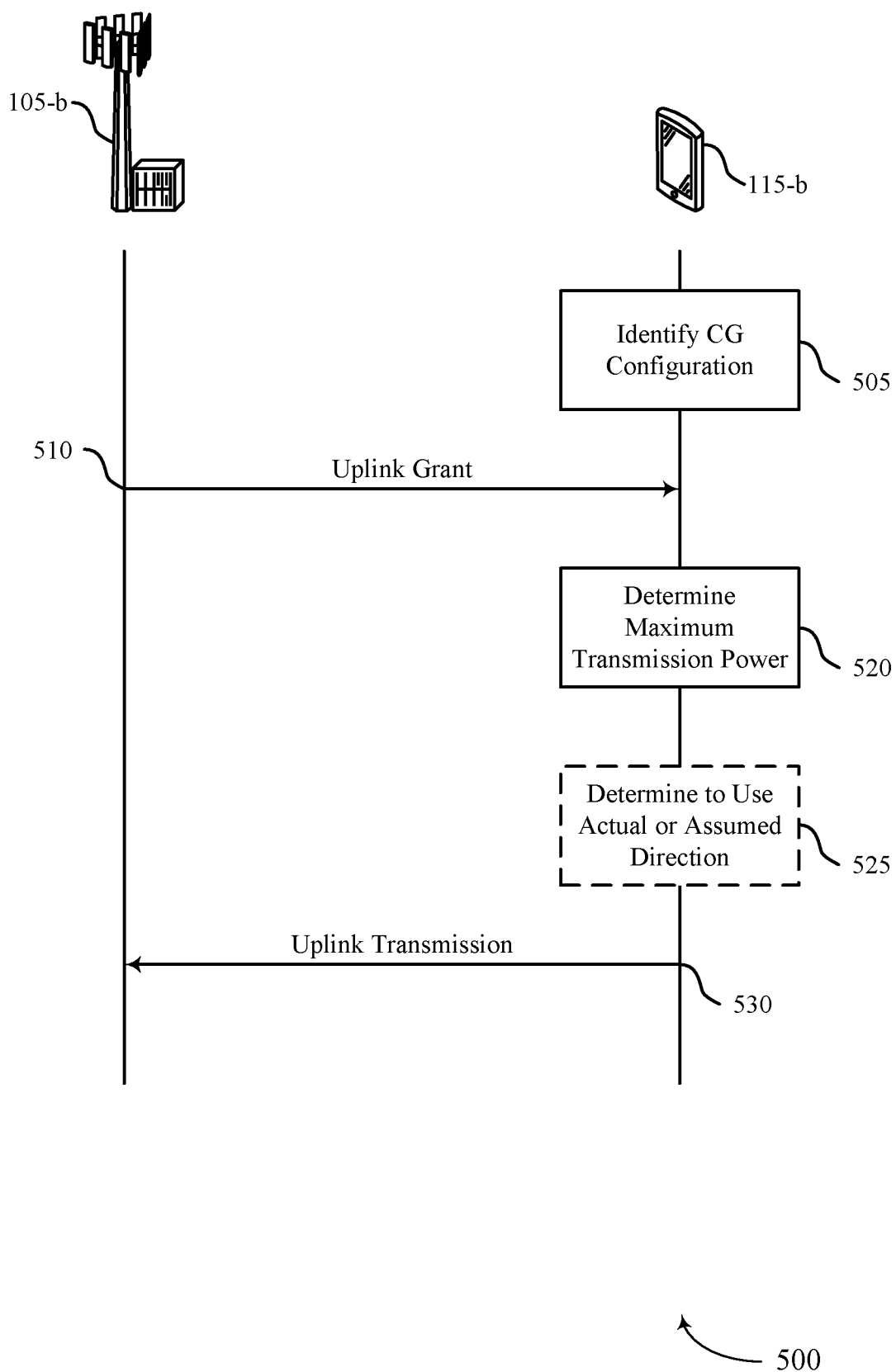
FIG. 5 illustrates an example of a process flow that supports power control based on semi-static direction for DC in accordance with aspects of the present disclosure.

FIG. 5 illustrates an example of a process flow 500 that supports power control based on semi-static direction for DC in accordance with aspects of the present disclosure. In some examples, process flow 500 may implement aspects of wireless communications systems 100 and/or 200. Process flow 500 may include a base station 105-*b* and a UE 115-*b*, which may be examples of corresponding base stations 105 and UEs 115, respectively, as described above with reference to FIGS. 1-4.

In the following description of the process flow 500, the operations between UE 115-*b* and base station 105-*b* may be performed in different orders or at different times. Certain operations may also be left out of the process flow 500, or other operations may be added to the process flow 500. It is to be understood that while UE 115-*b* is shown performing a number of the operations of process flow 500, any wireless device may perform the operations shown.

At 505, UE 115-*b* may identify that UE 115-*b* is configured with more than one CG, with a first CG having a first cell operating within a first frequency range and a second cell operating with a second frequency range, and with a second CG having at least a third cell operating within the first frequency range.

At 510, UE 115-*b* may receive an uplink grant scheduling an uplink transmission on the first cell during a symbol and within the first frequency range.

At 515, UE 115-*b* may determine a maximum transmission power for the uplink transmission based on a direction of communications with the third cell during a duration of the symbol and within a frequency range that includes the first frequency range and is exclusive of the second frequency range, where the direction is either an actual direction or an assumed direction. In some cases, the direction may include an uplink, downlink, or flexible (e.g., can be used for either uplink or downlink transmissions as indicated by base station 105-*b* or determined by UE 115-*b*) transmission direction.

Additionally, UE 115-*b* may determine to use a first maximum transmission power when the actual direction of communications with the third cell within the first frequency range is downlink and may determine to use a second maximum transmission power when the actual direction of communications with the third cell within the first frequency range is uplink or flexible, where the second maximum transmission power is different from the first maximum transmission power. In some cases, the second maximum transmission power may be less than the first maximum transmission power. Accordingly, UE 115-*b* may determine the actual direction based on a semi-static TDD configuration, a SMTC window, a downlink channel (e.g., PDCCH) monitoring occasion configuration, a downlink SPS configuration, MAC information, or a combination thereof. Additionally or alternatively, UE 115-*b* may assume that the direction of communications with the third cell within the first frequency range is either uplink or flexible and may determine to use, as the maximum transmission power, a lesser of two selectable maximum transmission power values, based on the assumption.

At 520, UE 115-*b* may determine whether to use the actual direction or the assumed direction of communications with the third cell within the first frequency range in determining the maximum transmission power for the uplink transmission. For example, UE 115-*b* may receive an additional uplink grant scheduling an additional uplink transmission on the second cell within the second frequency range and may determine an additional transmission power for the additional uplink transmission based on a direction of communications with a fourth cell of the second CG within the second frequency range but not within the first frequency range. In some cases, the uplink grant and the additional uplink grant may be received on the first cell and the second cell, respectively, and the maximum transmission power and the additional transmission power may each be determined based on the direction of communications (e.g., actual direction) within respective frequency ranges. Additionally or alternatively, the uplink grant and the additional uplink grant may be received jointly on the first cell (e.g., on a same CC) and with a CIF to indicate which CC (e.g., cell) each of the uplink grant and the additional uplink grant pertain, and the maximum transmission power and the additional transmission power may each be determined based on the direction of communications (e.g., actual directions) within respective frequency ranges.

Alternatively, UE 115-*b* may identify that cross-carrier scheduling across cells in different frequency ranges is configured, such that the uplink grant is received on a CC (e.g., cell) within the second frequency range, while the uplink transmission is scheduled within the first frequency range. Accordingly, UE 115-*b* may determine to use, as the maximum transmission power, a lesser of two selectable maximum transmission power values, based on cross-carrier scheduling across cells in different frequency ranges being configured. In some cases, the determination to use the lesser of the two selectable maximum transmission power values may be based on the assumed direction of communications with the third cell within the first frequency range. Additionally, UE 115-*b* may identify that the uplink grant is received via a DCI message and may determine to use the lesser of the two selectable maximum transmission power values as the maximum transmission power based on both the uplink grant being received via the DCI message and on cross-carrier scheduling across cells in different frequency ranges being configured. Further, in some cases, UE 115-*b* may identify that the uplink grant is received via a DCI message of format 0_1 with a CIF and may determine to use the lesser of the two selectable maximum transmission power values as the maximum transmission power based on both the uplink grant being received via the DCI message having format 0_1 and the CIF and on cross-carrier scheduling across cells in different frequency ranges being configured.

At 525, UE 115-*b* may transmit the uplink transmission on the first cell of the first CG within the first frequency range in accordance with the maximum transmission power.

Figure 6:
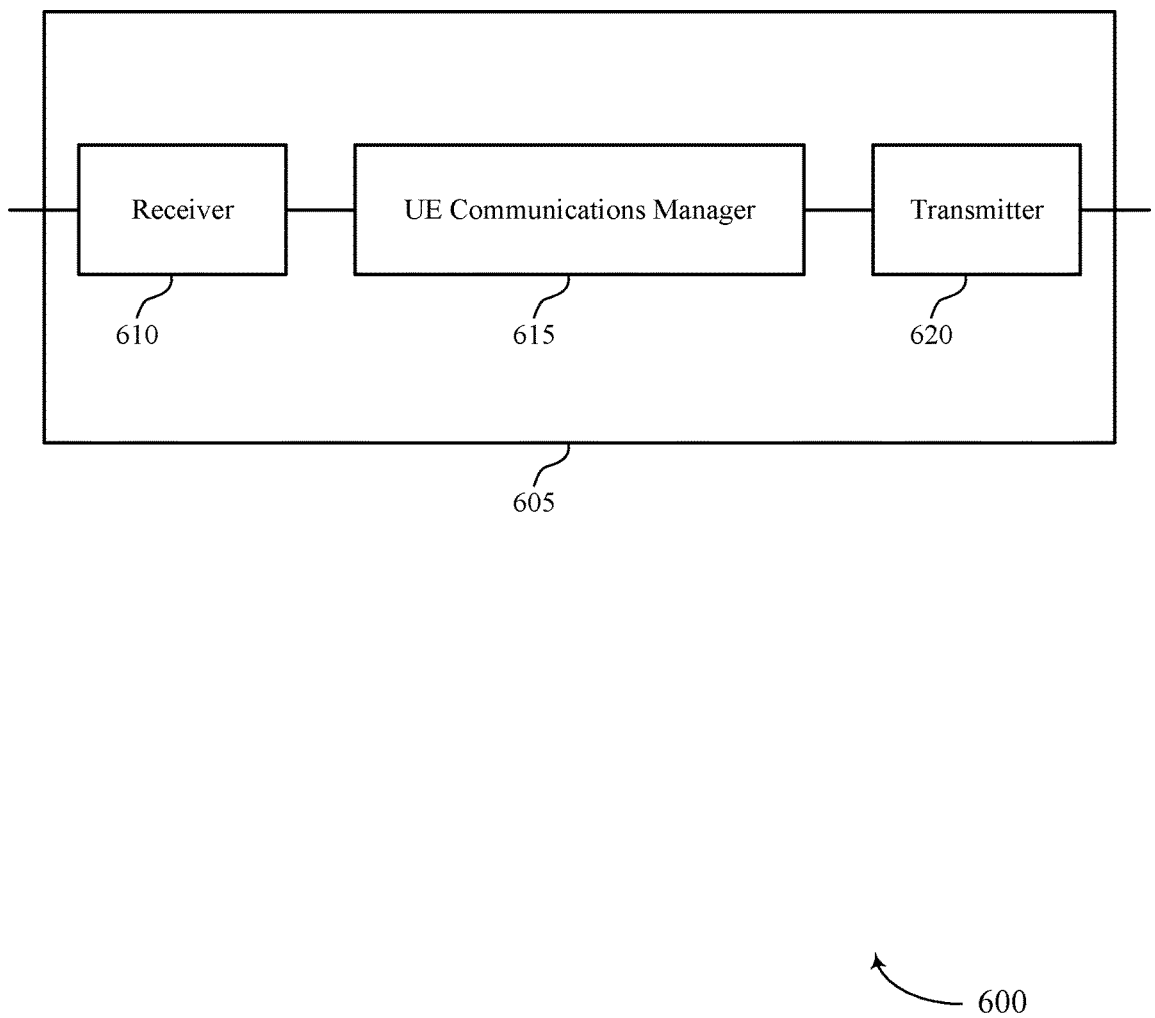
FIGS. 6 and 7 show block diagrams of devices that support power control based on semi-static direction for DC in accordance with aspects of the present disclosure.

FIG. 6 shows a block diagram 600 of a device 605 that supports power control based on semi-static direction for DC in accordance with aspects of the present disclosure. The device 605 may be an example of aspects of a UE 115 as described herein. The device 605 may include a receiver 610, an UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to power control based on semi-static direction for DC, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may identify that the UE is configured with more than one CG, with a first CG having a first cell operating within a first frequency range and a second cell operating with a second frequency range, and with a second CG having at least a third cell operating within the first frequency range. In some cases, the UE communications manager 615 may receive an uplink grant scheduling an uplink transmission on the first cell during a symbol and within the first frequency range. Additionally, the UE communications manager 615 may determine a maximum transmission power for the uplink transmission based on a direction of communications with the third cell during a duration of the symbol and within a frequency range that includes the first frequency range and is exclusive of the second frequency range, where the direction is either an actual direction or an assumed direction. Subsequently, the UE communications manager 615 may transmit the uplink transmission on the first cell of the first CG within the first frequency range in accordance with the maximum transmission power. The UE communications manager 615 may be an example of aspects of the UE communications manager 910 described herein.

Based on the actions performed by the UE communications manager 615 as described herein, a UE 115 may save power and increase the reliability that DC communications are successfully transmitted. For example, by determining maximum transmission powers per frequency range rather than by CG, the UE 115 may reduce the chances that a maximum power of the UE 115 is not exceeded, thereby increasing the reliability that appropriate transmission powers are used for each uplink transmission and that the uplink transmissions are successfully transmitted. Additionally, by more efficiently determining the maximum transmission powers, the UE 115 may save power by not allocating excess power per CG and instead allocating the power per frequency range.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
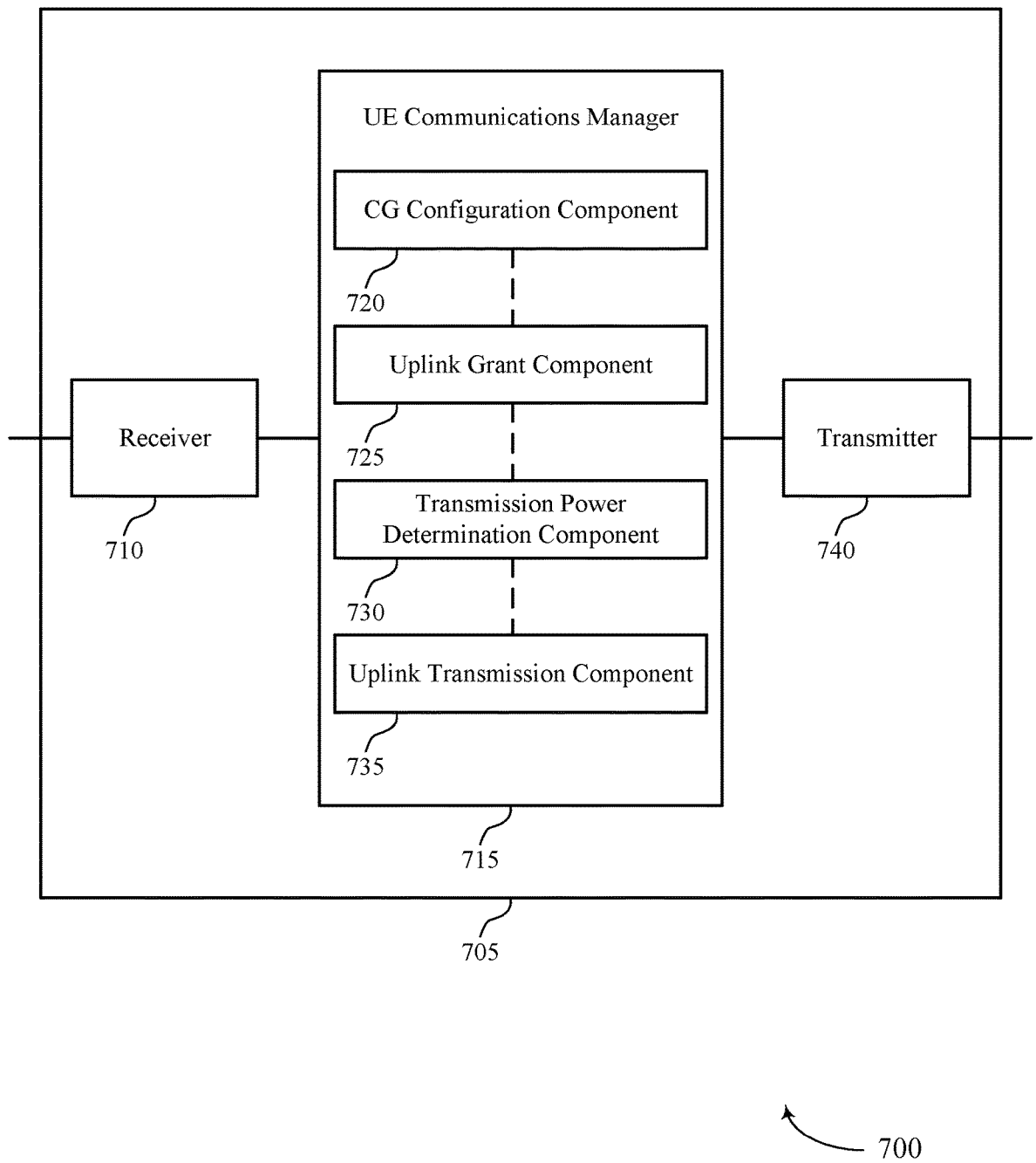

FIG. 7 shows a block diagram 700 of a device 705 that supports power control based on semi-static direction for DC in accordance with aspects of the present disclosure. The device 705 may be an example of aspects of a device 605, or a UE 115 as described herein. The device 705 may include a receiver 710, an UE communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to power control based on semi-static direction for DC, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a CG configuration component 720, an uplink grant component 725, a transmission power determination component 730, and an uplink transmission component 735. The UE communications manager 715 may be an example of aspects of the UE communications manager 910 described herein.

The CG configuration component 720 may identify that the UE is configured with more than one CG, with a first CG having a first cell operating within a first frequency range and a second cell operating with a second frequency range, and with a second CG having at least a third cell operating within the first frequency range.

The uplink grant component 725 may receive an uplink grant scheduling an uplink transmission on the first cell during a symbol and within the first frequency range.

The transmission power determination component 730 may determine a maximum transmission power for the uplink transmission based on a direction of communications with the third cell during a duration of the symbol and within a frequency range that includes the first frequency range and is exclusive of the second frequency range, where the direction is either an actual direction or an assumed direction.

The uplink transmission component 735 may transmit the uplink transmission on the first cell of the first CG within the first frequency range in accordance with the maximum transmission power.

Based on determining the maximum transmission power for the uplink transmission based on the direction of communications with the third cell, a processor of a UE 115 (e.g., controlling the receiver 710, the transmitter 740, or a transceiver 920 as described with reference to FIG. 9) may efficiently prepare the uplink transmission with an optimal transmission power. For example, if the actual direction is determined and used for determining the maximum transmission power, the processor of the UE 115 may allocate a specific transmission power that most efficiently utilizes the available transmission power of the UE 115 based on actual knowledge of other transmission power allocations. Additionally or alternatively, if the assumed direction is determined and used for determining the maximum transmission power, the processor of the UE 115 may more efficiently prepare the transmission power of the uplink transmission based on not having to identify the actual direction, thereby reducing processing complexity and saving power.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
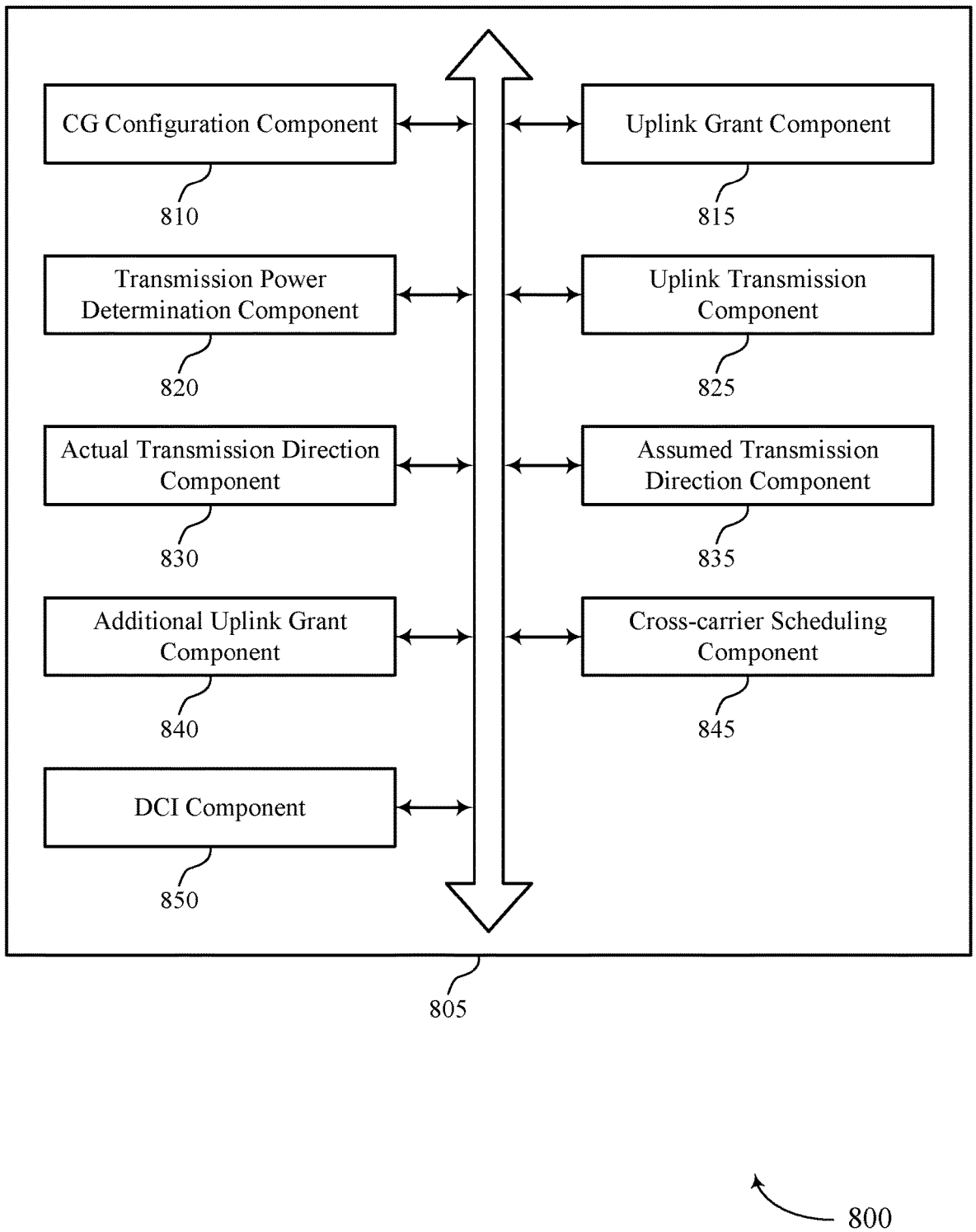
FIG. 8 shows a block diagram of a UE communications manager that supports power control based on semi-static direction for DC in accordance with aspects of the present disclosure.

FIG. 8 shows a block diagram 800 of a UE communications manager 805 that supports power control based on semi-static direction for DC in accordance with aspects of the present disclosure. The UE communications manager 805 may be an example of aspects of a UE communications manager 615, a UE communications manager 715, or a UE communications manager 910 described herein. The UE communications manager 805 may include a CG configuration component 810, an uplink grant component 815, a transmission power determination component 820, an uplink transmission component 825, an actual transmission direction component 830, an assumed transmission direction component 835, an additional uplink grant component 840, a cross-carrier scheduling component 845, and a DCI component 850. Each of these modules may communicate, directly or indirectly, with one another (e.g., via one or more buses).

The CG configuration component 810 may identify that the UE is configured with more than one CG, with a first CG having a first cell operating within a first frequency range and a second cell operating with a second frequency range, and with a second CG having at least a third cell operating within the first frequency range.

The uplink grant component 815 may receive an uplink grant scheduling an uplink transmission on the first cell during a symbol and within the first frequency range.

The transmission power determination component 820 may determine a maximum transmission power for the uplink transmission based on a direction of communications with the third cell during a duration of the symbol and within a frequency range that includes the first frequency range and is exclusive of the second frequency range, where the direction is either an actual direction or an assumed direction. In some examples, the transmission power determination component 820 may determine whether to use the actual direction or the assumed direction of communications with the third cell within the first frequency range in determining the maximum transmission power for the uplink transmission. Accordingly, in some cases, the transmission power determination component 820 may determine the actual direction based on a semi-static TDD configuration, a SMTC window, a downlink channel monitoring occasion configuration, a downlink SPS configuration, MAC information, or a combination thereof. In some cases, the direction includes an uplink, downlink, or flexible transmission direction.

The uplink transmission component 825 may transmit the uplink transmission on the first cell of the first CG within the first frequency range in accordance with the maximum transmission power.

The actual transmission direction component 830 may determine to use a first maximum transmission power when the actual direction of communications with the third cell within the first frequency range is downlink. In some examples, the actual transmission direction component 830 may determine to use a second maximum transmission power when the actual direction of communications with the third cell within the first frequency range is uplink or flexible, where the second maximum transmission power is different from the first maximum transmission power. In some cases, the second maximum transmission power may be less than the first maximum transmission power.

The assumed transmission direction component 835 may assume that the direction of communications with the third cell within the first frequency range is either uplink or flexible. In some examples, the assumed transmission direction component 835 may determine to use, as the maximum transmission power, a lesser of two selectable maximum transmission power values, based on the assumption.

The additional uplink grant component 840 may receive an additional uplink grant scheduling an additional uplink transmission on the second cell within the second frequency range. In some examples, the additional uplink grant component 840 may determine an additional transmission power for the additional uplink transmission based on a direction of communications with a fourth cell of the second CG within the second frequency range but not within the first frequency range. In some cases, the uplink grant and the additional uplink grant may be received on the first cell and the second cell, respectively, and the maximum transmission power and the additional transmission power may be each determined based on the direction of communications within respective frequency ranges. Additionally or alternatively, the uplink grant and the additional uplink grant may be received jointly on the first cell and with a CIF to indicate which CC each of the uplink grant and the additional uplink grant pertain, and the maximum transmission power and the additional transmission power may be each determined based on the direction of communications within respective frequency ranges.

The cross-carrier scheduling component 845 may identify that cross-carrier scheduling across cells in different frequency ranges is configured, such that the uplink grant is received on a CC within the second frequency range, while the uplink transmission is scheduled within the first frequency range. In some examples, the cross-carrier scheduling component 845 may determine to use, as the maximum transmission power, a lesser of two selectable maximum transmission power values, based on cross-carrier scheduling across cells in different frequency ranges being configured. In some cases, the determination to use the lesser of the two selectable maximum transmission power values may be based on the assumed direction of communications with the third cell within the first frequency range.

The DCI component 850 may identify that the uplink grant is received via a DCI message. Accordingly, the DCI component 850 may determine to use the lesser of the two selectable maximum transmission power values as the maximum transmission power based on both the uplink grant being received via the DCI message and on cross-carrier scheduling across cells in different frequency ranges being configured. Additionally or alternatively, the DCI component 850 may identify that the uplink grant is received via a DCI message of format 0_1 with a CIF. Accordingly, the DCI component 850 may determine to use the lesser of the two selectable maximum transmission power values as the maximum transmission power based on both the uplink grant being received via the DCI message having format 0_1 and the CIF and on cross-carrier scheduling across cells in different frequency ranges being configured.

Figure 9:
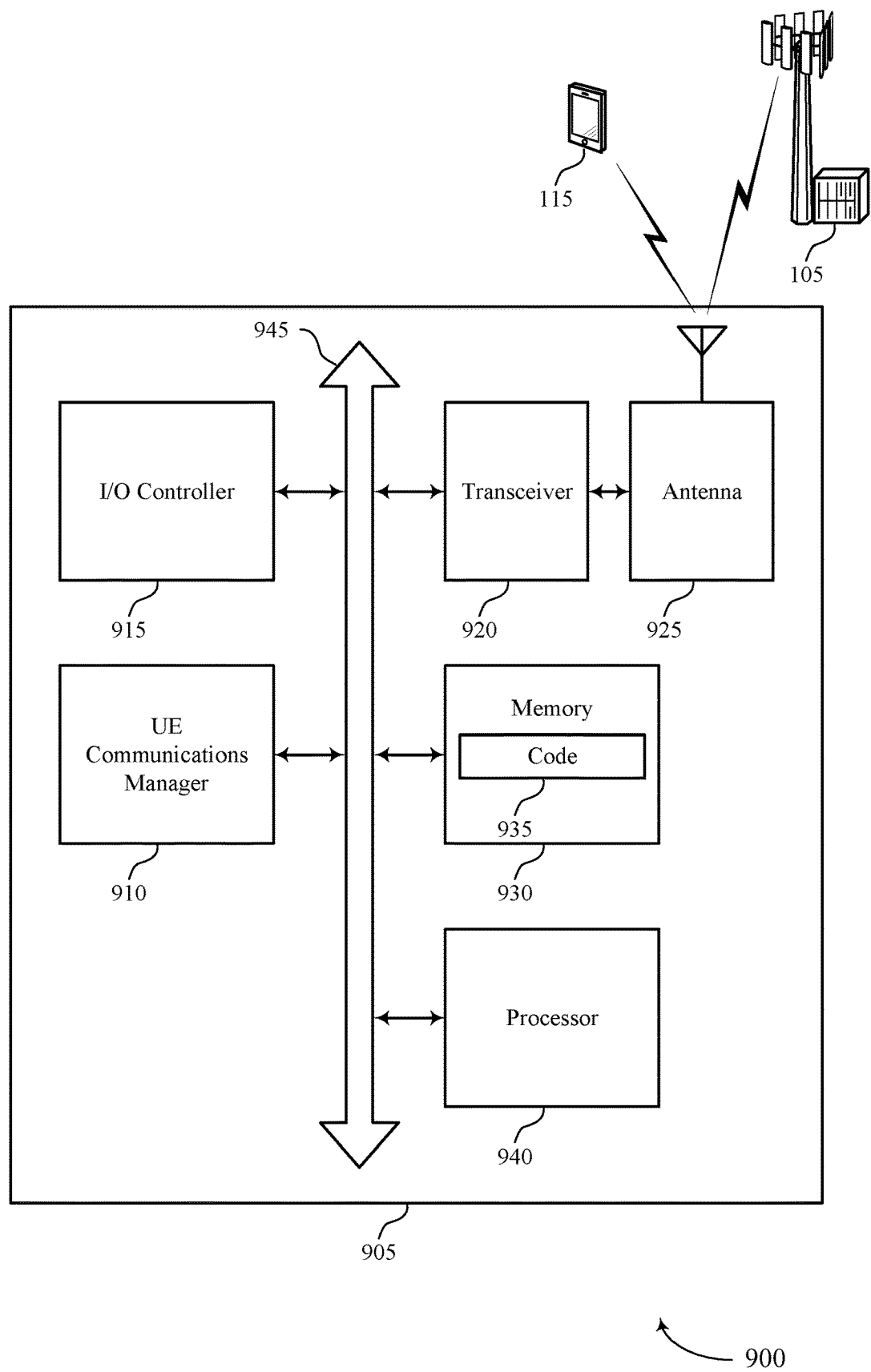
FIG. 9 shows a diagram of a system including a device that supports power control based on semi-static direction for DC in accordance with aspects of the present disclosure.

FIG. 9 shows a diagram of a system 900 including a device 905 that supports power control based on semi-static direction for DC in accordance with aspects of the present disclosure. The device 905 may be an example of or include the components of device 605, device 705, or a UE 115 as described herein. The device 905 may include components for bi-directional voice and data communications including components for transmitting and receiving communications, including an UE communications manager 910, an I/O controller 915, a transceiver 920, an antenna 925, memory 930, and a processor 940. These components may be in electronic communication via one or more buses (e.g., bus 945).

The UE communications manager 910 may identify that the UE is configured with more than one CG, with a first CG having a first cell operating within a first frequency range and a second cell operating with a second frequency range, and with a second CG having at least a third cell operating within the first frequency range. In some cases, the UE communications manager 910 may receive an uplink grant scheduling an uplink transmission on the first cell during a symbol and within the first frequency range. Additionally, the UE communications manager 910 may determine a maximum transmission power for the uplink transmission based on a direction of communications with the third cell during a duration of the symbol and within a frequency range that includes the first frequency range and is exclusive of the second frequency range, where the direction is either an actual direction or an assumed direction. Subsequently, the UE communications manager 910 may transmit the uplink transmission on the first cell of the first CG within the first frequency range in accordance with the maximum transmission power.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting power control based on semi-static direction for DC).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
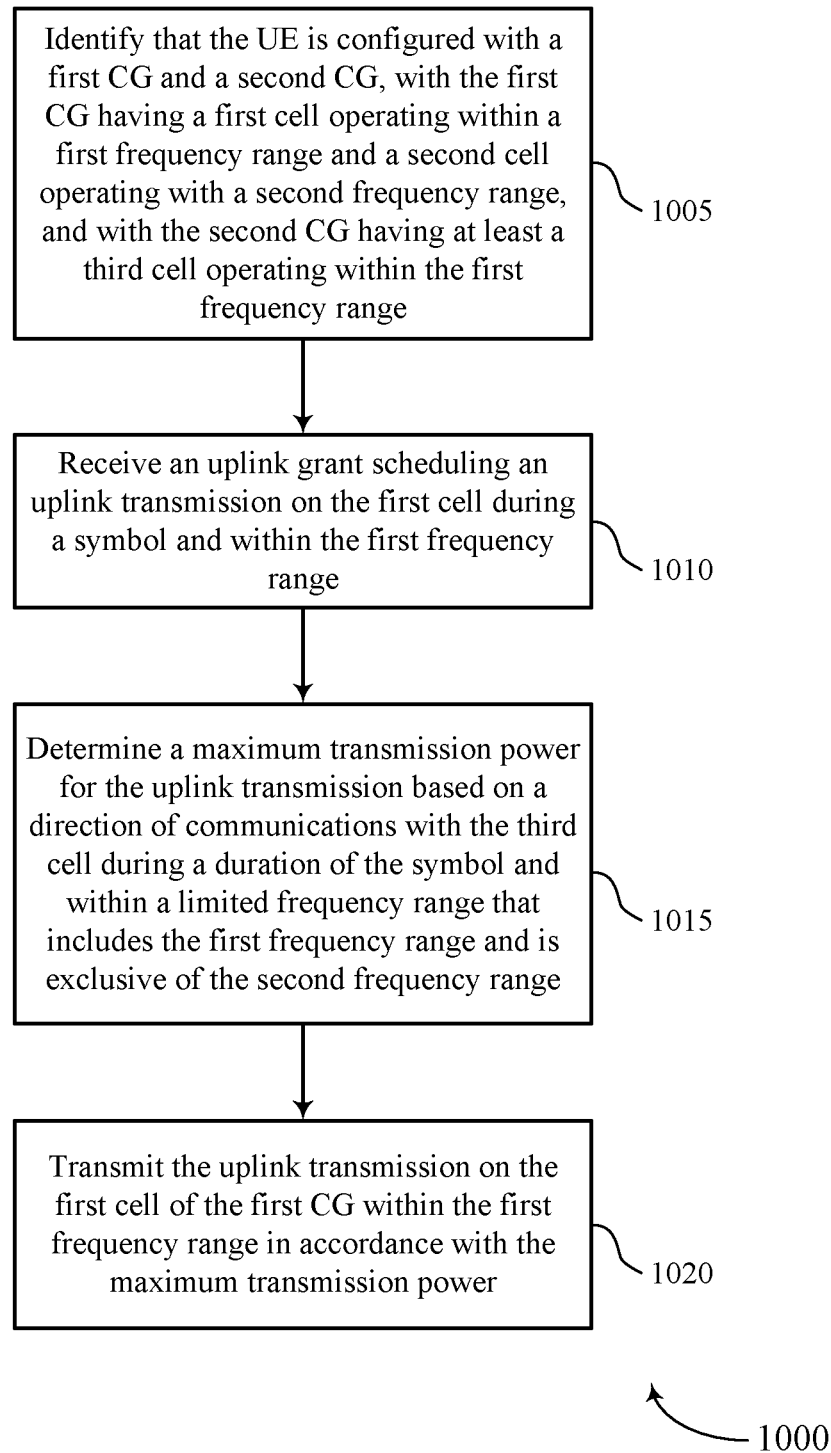
FIGS. 10 through 13 show flowcharts illustrating methods that support power control based on semi-static direction for DC in accordance with aspects of the present disclosure.

FIG. 10 shows a flowchart illustrating a method 1000 that supports power control based on semi-static direction for DC in accordance with aspects of the present disclosure. The operations of method 1000 may be implemented by a UE 115 or its components as described herein. For example, the operations of method 1000 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may identify that the UE is configured with more than one CG, with a first CG having a first cell operating within a first frequency range and a second cell operating with a second frequency range, and with a second CG having at least a third cell operating within the first frequency range. The operations of 1005 may be performed according to the methods described herein. In some examples, aspects of the operations of 1005 may be performed by a CG configuration component as described with reference to FIGS. 6 through 9.

At 1010, the UE may receive an uplink grant scheduling an uplink transmission on the first cell during a symbol and within the first frequency range. The operations of 1010 may be performed according to the methods described herein. In some examples, aspects of the operations of 1010 may be performed by an uplink grant component as described with reference to FIGS. 6 through 9.

At 1015, the UE may determine a maximum transmission power for the uplink transmission based on a direction of communications with the third cell during a duration of the symbol and within a frequency range that includes the first frequency range and is exclusive of the second frequency range, where the direction is either an actual direction or an assumed direction. The operations of 1015 may be performed according to the methods described herein. In some examples, aspects of the operations of 1015 may be performed by a transmission power determination component as described with reference to FIGS. 6 through 9.

At 1020, the UE may transmit the uplink transmission on the first cell of the first CG within the first frequency range in accordance with the maximum transmission power. The operations of 1020 may be performed according to the methods described herein. In some examples, aspects of the operations of 1020 may be performed by an uplink transmission component as described with reference to FIGS. 6 through 9.

Figure 11:
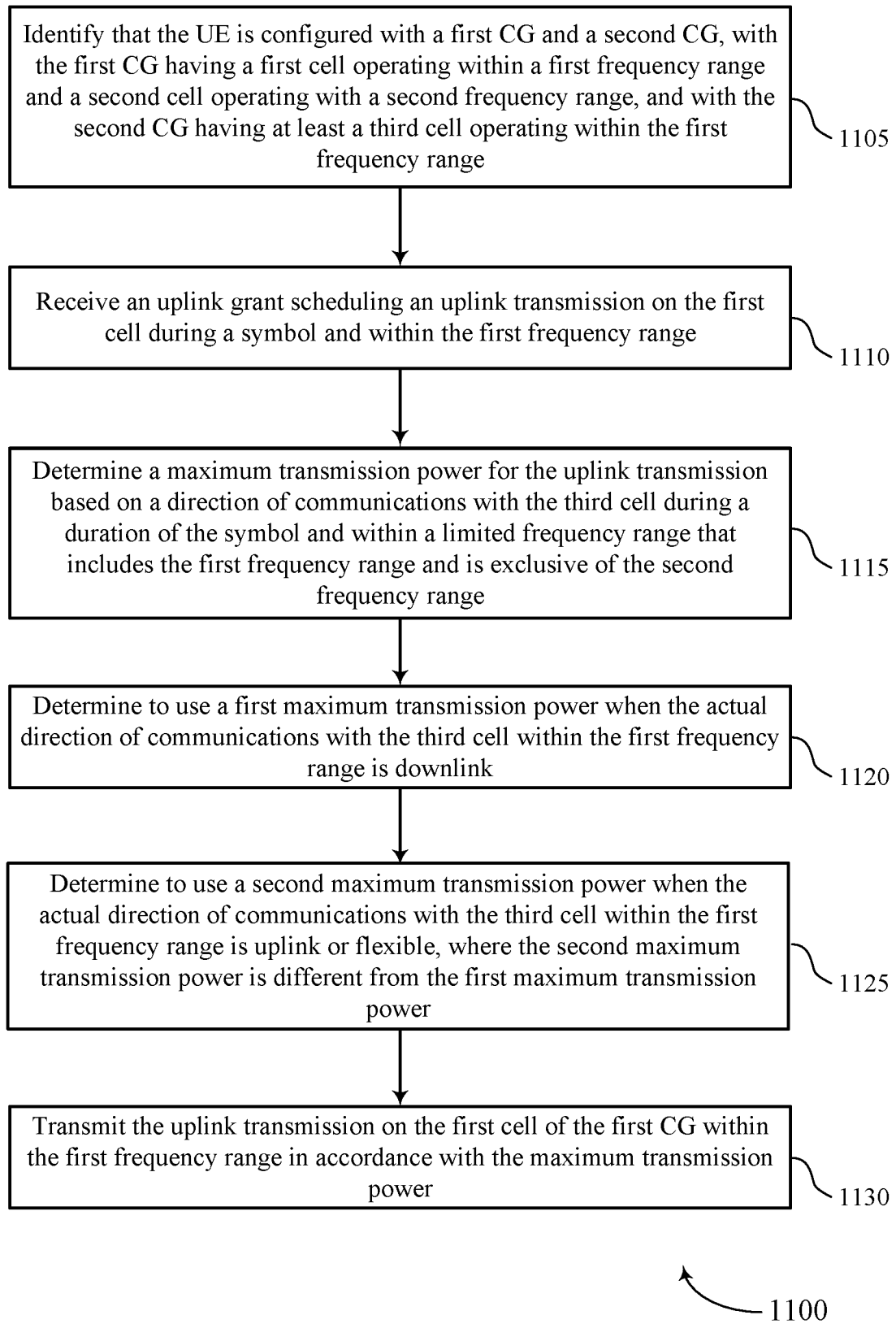

FIG. 11 shows a flowchart illustrating a method 1100 that supports power control based on semi-static direction for DC in accordance with aspects of the present disclosure. The operations of method 1100 may be implemented by a UE 115 or its components as described herein. For example, the operations of method 1100 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may identify that the UE is configured with more than one CG, with a first CG having a first cell operating within a first frequency range and a second cell operating with a second frequency range, and with a second CG having at least a third cell operating within the first frequency range. The operations of 1105 may be performed according to the methods described herein. In some examples, aspects of the operations of 1105 may be performed by a CG configuration component as described with reference to FIGS. 6 through 9.

At 1110, the UE may receive an uplink grant scheduling an uplink transmission on the first cell during a symbol and within the first frequency range. The operations of 1110 may be performed according to the methods described herein. In some examples, aspects of the operations of 1110 may be performed by an uplink grant component as described with reference to FIGS. 6 through 9.

At 1115, the UE may determine a maximum transmission power for the uplink transmission based on a direction of communications with the third cell during a duration of the symbol and within a frequency range that includes the first frequency range and is exclusive of the second frequency range, where the direction is either an actual direction or an assumed direction. The operations of 1115 may be performed according to the methods described herein. In some examples, aspects of the operations of 1115 may be performed by a transmission power determination component as described with reference to FIGS. 6 through 9.

At 1120, the UE may determine to use a first maximum transmission power when the actual direction of communications with the third cell within the first frequency range is downlink. The operations of 1120 may be performed according to the methods described herein. In some examples, aspects of the operations of 1120 may be performed by an actual transmission direction component as described with reference to FIGS. 6 through 9.

At 1125, the UE may determine to use a second maximum transmission power when the actual direction of communications with the third cell within the first frequency range is uplink or flexible, where the second maximum transmission power is different from the first maximum transmission power. The operations of 1125 may be performed according to the methods described herein. In some examples, aspects of the operations of 1125 may be performed by an actual transmission direction component as described with reference to FIGS. 6 through 9.

At 1130, the UE may transmit the uplink transmission on the first cell of the first CG within the first frequency range in accordance with the maximum transmission power. The operations of 1130 may be performed according to the methods described herein. In some examples, aspects of the operations of 1130 may be performed by an uplink transmission component as described with reference to FIGS. 6 through 9.

Figure 12:
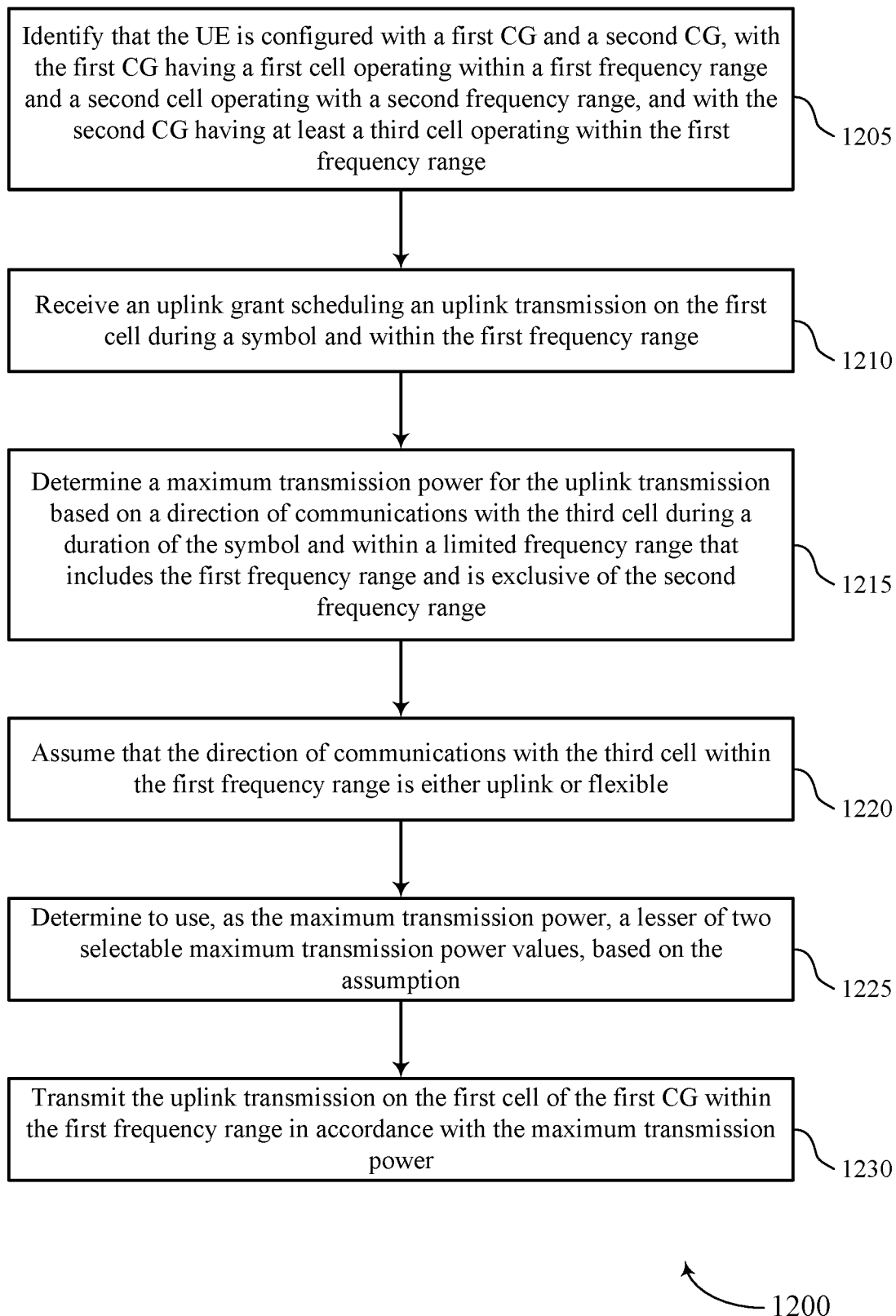

FIG. 12 shows a flowchart illustrating a method 1200 that supports power control based on semi-static direction for DC in accordance with aspects of the present disclosure. The operations of method 1200 may be implemented by a UE 115 or its components as described herein. For example, the operations of method 1200 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may identify that the UE is configured with more than one CG, with a first CG having a first cell operating within a first frequency range and a second cell operating with a second frequency range, and with a second CG having at least a third cell operating within the first frequency range. The operations of 1205 may be performed according to the methods described herein. In some examples, aspects of the operations of 1205 may be performed by a CG configuration component as described with reference to FIGS. 6 through 9.

At 1210, the UE may receive an uplink grant scheduling an uplink transmission on the first cell during a symbol and within the first frequency range. The operations of 1210 may be performed according to the methods described herein. In some examples, aspects of the operations of 1210 may be performed by an uplink grant component as described with reference to FIGS. 6 through 9.

At 1215, the UE may determine a maximum transmission power for the uplink transmission based on a direction of communications with the third cell during a duration of the symbol and within a frequency range that includes the first frequency range and is exclusive of the second frequency range, where the direction is either an actual direction or an assumed direction. The operations of 1215 may be performed according to the methods described herein. In some examples, aspects of the operations of 1215 may be performed by a transmission power determination component as described with reference to FIGS. 6 through 9.

At 1220, the UE may assume that the direction of communications with the third cell within the first frequency range is either uplink or flexible. The operations of 1220 may be performed according to the methods described herein. In some examples, aspects of the operations of 1220 may be performed by an assumed transmission direction component as described with reference to FIGS. 6 through 9.

At 1225, the UE may determine to use, as the maximum transmission power, a lesser of two selectable maximum transmission power values, based on the assumption. The operations of 1225 may be performed according to the methods described herein. In some examples, aspects of the operations of 1225 may be performed by an assumed transmission direction component as described with reference to FIGS. 6 through 9.

At 1230, the UE may transmit the uplink transmission on the first cell of the first CG within the first frequency range in accordance with the maximum transmission power. The operations of 1230 may be performed according to the methods described herein. In some examples, aspects of the operations of 1230 may be performed by an uplink transmission component as described with reference to FIGS. 6 through 9.

Figure 13:
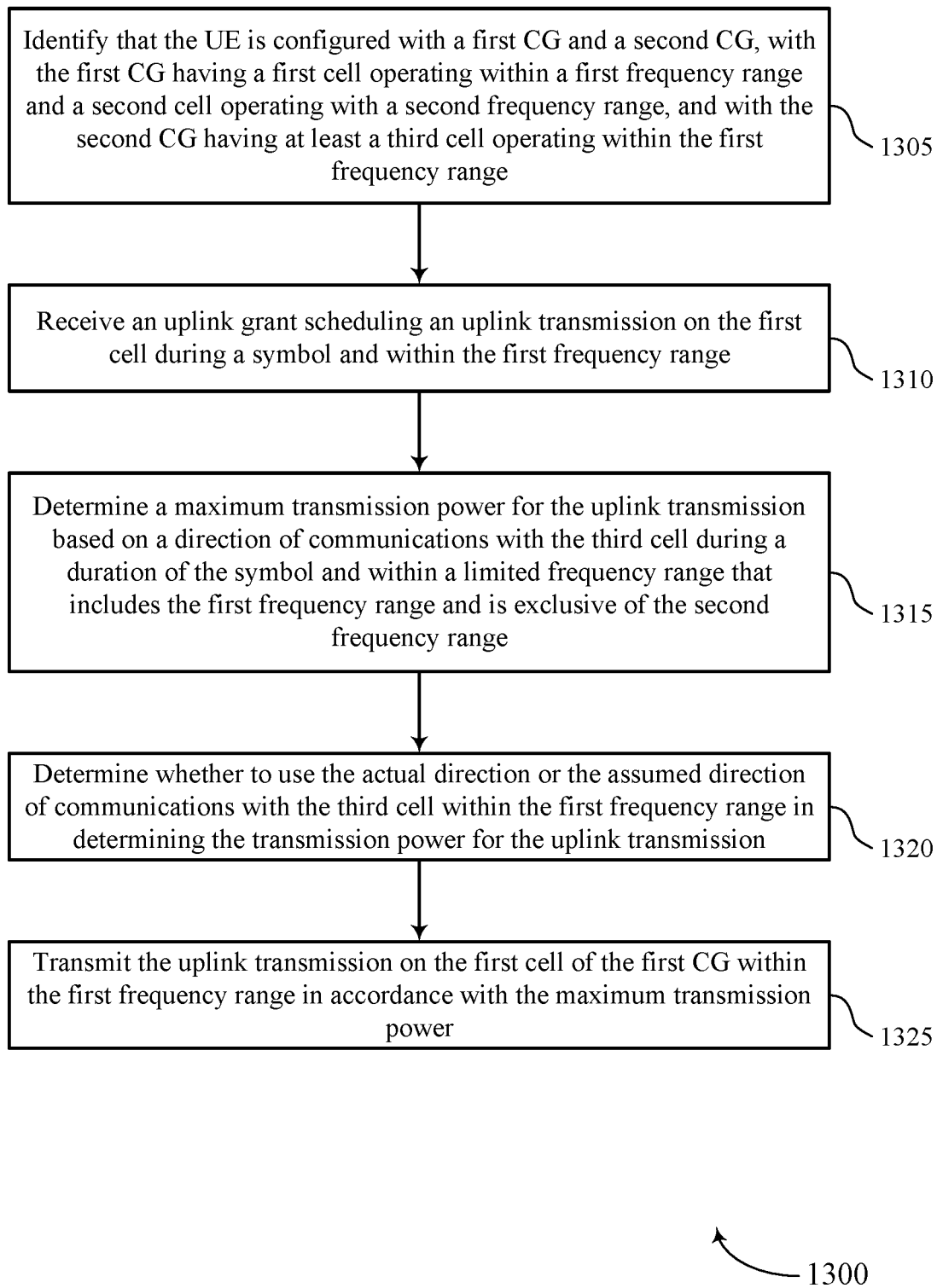

FIG. 13 shows a flowchart illustrating a method 1300 that supports power control based on semi-static direction for DC in accordance with aspects of the present disclosure. The operations of method 1300 may be implemented by a UE 115 or its components as described herein. For example, the operations of method 1300 may be performed by a UE communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may identify that the UE is configured with more than one CG, with a first CG having a first cell operating within a first frequency range and a second cell operating with a second frequency range, and with a second CG having at least a third cell operating within the first frequency range. The operations of 1305 may be performed according to the methods described herein. In some examples, aspects of the operations of 1305 may be performed by a CG configuration component as described with reference to FIGS. 6 through 9.

At 1310, the UE may receive an uplink grant scheduling an uplink transmission on the first cell during a symbol and within the first frequency range. The operations of 1310 may be performed according to the methods described herein. In some examples, aspects of the operations of 1310 may be performed by an uplink grant component as described with reference to FIGS. 6 through 9.

At 1315, the UE may determine a maximum transmission power for the uplink transmission based on a direction of communications with the third cell during a duration of the symbol and within a frequency range that includes the first frequency range and is exclusive of the second frequency range, where the direction is either an actual direction or an assumed direction. The operations of 1315 may be performed according to the methods described herein. In some examples, aspects of the operations of 1315 may be performed by a transmission power determination component as described with reference to FIGS. 6 through 9.

At 1320, the UE may determine whether to use the actual direction or the assumed direction of communications with the third cell within the first frequency range in determining the maximum transmission power for the uplink transmission. The operations of 1320 may be performed according to the methods described herein. In some examples, aspects of the operations of 1320 may be performed by a transmission power determination component as described with reference to FIGS. 6 through 9.

At 1325, the UE may transmit the uplink transmission on the first cell of the first CG within the first frequency range in accordance with the maximum transmission power. The operations of 1325 may be performed according to the methods described herein. In some examples, aspects of the operations of 1325 may be performed by an uplink transmission component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of non-limiting examples of the present disclosure:

Example 1: A method for wireless communications at a user equipment (UE), comprising: identifying that the UE is configured with a first cell group and a second cell group, the first cell group having a first cell operating within a first frequency range and a second cell operating with a second frequency range, and the second cell group having at least a third cell operating within the first frequency range; receiving an uplink grant scheduling an uplink transmission on the first cell during a symbol and within the first frequency range; determining a maximum transmission power for the uplink transmission based at least in part on a direction of communications with the third cell during a duration of the symbol and within a frequency range that includes the first frequency range and is exclusive of the second frequency range; and transmitting the uplink transmission on the first cell of the first cell group within the first frequency range in accordance with the maximum transmission power.

Example 2: The method of example 1, wherein determining the maximum transmission power for the uplink transmission comprises: determining to use a first maximum transmission power when an actual direction of communications with the third cell within the first frequency range is downlink; and determining to use a second maximum transmission power when the actual direction of communications with the third cell within the first frequency range is uplink or flexible, wherein the second maximum transmission power is different from the first maximum transmission power.

Example 3: The method of examples 1 or 2, wherein the second maximum transmission power is less than the first maximum transmission power.

Example 4: The method of any of examples 1 through 3, wherein determining the maximum transmission power for the uplink transmission comprises: assuming that the direction of communications with the third cell within the first frequency range is either uplink or flexible; and determining to use, as the maximum transmission power, a lesser of two selectable maximum transmission power values, based at least in part on the assumption.

Example 5: The method of any of examples 1 through 4, further comprising: determining whether to use the actual direction or the assumed direction of communications with the third cell within the first frequency range in determining the maximum transmission power for the uplink transmission.

Example 6: The method of any of examples 1 through 5, further comprising: receiving an additional uplink grant scheduling an additional uplink transmission on the second cell within the second frequency range; and determining an additional transmission power for the additional uplink transmission based at least in part on a direction of communications with a fourth cell of the second cell group within the second frequency range but not within the first frequency range.

Example 7: The method of any of examples 1 through 6, wherein the uplink grant and the additional uplink grant are received on the first cell and the second cell, respectively, and wherein the maximum transmission power and the additional transmission power are each determined based at least in part on the direction of communications within respective frequency ranges.

Example 8: The method of any of examples 1 through 7, wherein the uplink grant and the additional uplink grant are received jointly on the first cell and with a carrier indication field to indicate which component carrier each of the uplink grant and the additional uplink grant pertain, and wherein the maximum transmission power and the additional transmission power are each determined based at least in part on the direction of communications within respective frequency ranges.

Example 9: The method of any of examples 1 through 8, further comprising: identifying that cross-carrier scheduling across cells in different frequency ranges is configured, such that the uplink grant is received on a component carrier within the second frequency range, while the uplink transmission is scheduled within the first frequency range; and determining to use, as the maximum transmission power, a lesser of two selectable maximum transmission power values, based at least in part on cross-carrier scheduling across cells in different frequency ranges being configured.

Example 10: The method of any of examples 1 through 9, wherein the determination to use the lesser of the two selectable maximum transmission power values is based on the assumed direction of communications with the third cell within the first frequency range.

Example 11: The method of any of examples 1 through 10, wherein determining to use, as the maximum transmission power, the lesser of the two selectable maximum transmission power values further comprises: identifying that the uplink grant is received via a downlink control information message; and determining to use the lesser of the two selectable maximum transmission power values as the maximum transmission power based on both the uplink grant being received via the downlink control information message and on cross-carrier scheduling across cells in different frequency ranges being configured.

Example 12: The method of any of examples 1 through 11, wherein determining to use, as the maximum transmission power, the lesser of the two selectable maximum transmission power values further comprises: identifying that the uplink grant is received via a downlink control information message of format 0_1 with a carrier indication field; and determining to use the lesser of the two selectable maximum transmission power values as the maximum transmission power based on both the uplink grant being received via the downlink control information message having format 0_1 and the carrier indication field and on cross-carrier scheduling across cells in different frequency ranges being configured.

Example 13: The method of any of examples 1 through 12, further comprising: determining the actual direction based at least in part on a semi-static time domain duplexing configuration, a synchronization signal/physical broadcast channel block measurement time configuration window, a downlink channel monitoring occasion configuration, a downlink semi-persistent scheduling configuration, medium access control information, or a combination thereof.

Example 14: The method of any of examples 1 through 13, wherein the direction comprises an uplink, downlink, or flexible transmission direction.

Example 15: An apparatus for wireless communications comprising a processor; memory coupled with the processor; and instructions stored in the memory and executable by the processor to cause the apparatus to perform a method of any of examples 1 through 14.

Example 16: An apparatus for wireless communications comprising at least one means for performing a method of any of examples 1 through 14.

Example 17: A non-transitory computer-readable medium storing code for wireless communications, the code comprising instructions executable by a processor to perform a method of any of examples 1 through 14.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    identifying that the UE is configured with a first cell group and a second cell group, the first cell group having a first cell operating within a first frequency range and a second cell operating with a second frequency range, and the second cell group having at least a third cell operating within the first frequency range;
    receiving an uplink grant scheduling an uplink transmission on the first cell during a symbol and within the first frequency range;
    determining a maximum transmission power for the uplink transmission based at least in part on a direction of communications with the third cell during a duration of the symbol and within a frequency range that includes the first frequency range and is exclusive of the second frequency range; and transmitting the uplink transmission on the first cell of the first cell group within the first frequency range in accordance with the maximum transmission power.

2. The method of claim 1, wherein determining the maximum transmission power for the uplink transmission comprises:

determining to use a first maximum transmission power when an actual direction of communications with the third cell within the first frequency range is downlink; and determining to use a second maximum transmission power when the actual direction of communications with the third cell within the first frequency range is uplink or flexible, wherein the second maximum transmission power is different from the first maximum transmission power.

3. The method of claim 2, wherein the second maximum transmission power is less than the first maximum transmission power.

4. The method of claim 1, wherein determining the maximum transmission power for the uplink transmission comprises:

assuming that the direction of communications with the third cell within the first frequency range is either uplink or flexible; and determining to use, as the maximum transmission power, a lesser of two selectable maximum transmission power values, based at least in part on the assumption.

5. The method of claim 1, further comprising:

determining whether to use an actual direction or an assumed direction of communications with the third cell within the first frequency range in determining the maximum transmission power for the uplink transmission.

6. The method of claim 1, further comprising:

receiving an additional uplink grant scheduling an additional uplink transmission on the second cell within the second frequency range; and determining an additional transmission power for the additional uplink transmission based at least in part on a direction of communications with a fourth cell of the second cell group within the second frequency range but not within the first frequency range.

7. The method of claim 6, wherein the uplink grant and the additional uplink grant are received on the first cell and the second cell, respectively, and wherein the maximum transmission power and the additional transmission power are each determined based at least in part on the direction of communications within respective frequency ranges.

8. The method of claim 6, wherein the uplink grant and the additional uplink grant are received jointly on the first cell and with a carrier indication field to indicate which component carrier each of the uplink grant and the additional uplink grant pertain, and wherein the maximum transmission power and the additional transmission power are each determined based at least in part on the direction of communications within respective frequency ranges.

9. The method of claim 1, further comprising:

identifying that cross-carrier scheduling across cells in different frequency ranges is configured, such that the uplink grant is received on a component carrier within the second frequency range, while the uplink transmission is scheduled within the first frequency range; and determining to use, as the maximum transmission power, a lesser of two selectable maximum transmission power values, based at least in part on cross-carrier scheduling across cells in different frequency ranges being configured.

10. The method of claim 9, wherein the determination to use the lesser of the two selectable maximum transmission power values is based on an assumed direction of communications with the third cell within the first frequency range.

11. The method of claim 9, wherein determining to use, as the maximum transmission power, the lesser of the two selectable maximum transmission power values further comprises:

identifying that the uplink grant is received via a downlink control information message; and determining to use the lesser of the two selectable maximum transmission power values as the maximum transmission power based on both the uplink grant being received via the downlink control information message and on cross-carrier scheduling across cells in different frequency ranges being configured.

12. The method of claim 9, wherein determining to use, as the maximum transmission power, the lesser of the two selectable maximum transmission power values further comprises:

identifying that the uplink grant is received via a downlink control information message of format 0_1 with a carrier indication field; and determining to use the lesser of the two selectable maximum transmission power values as the maximum transmission power based on both the uplink grant being received via the downlink control information message having format 0_1 and the carrier indication field and on cross-carrier scheduling across cells in different frequency ranges being configured.

13. The method of claim 1, further comprising:

determining an actual direction based at least in part on a semi-static time domain duplexing configuration, a synchronization signal/physical broadcast channel block measurement time configuration window, a downlink channel monitoring occasion configuration, a downlink semi-persistent scheduling configuration, medium access control information, or a combination thereof.

14. The method of claim 1, wherein the direction comprises an uplink, downlink, or flexible transmission direction.

15. An apparatus for wireless communications at a user equipment (UE), comprising:

a processor, memory coupled with the processor; and instructions stored in the memory and executable by the processor to cause the apparatus to:

identify that the UE is configured with more than one cell group, with a first cell group having a first cell operating within a first frequency range and a second cell operating with a second frequency range, and with a second cell group having at least a third cell operating within the first frequency range;

receive an uplink grant scheduling an uplink transmission on the first cell during a symbol and within the first frequency range;

determine a maximum transmission power for the uplink transmission based at least in part on a direction of communications with the third cell during a duration of the symbol and within a frequency range that includes the first frequency range and is exclusive of the second frequency range; and transmit the uplink transmission on the first cell of the first cell group within the first frequency range in accordance with the maximum transmission power.

16. The apparatus of claim 15, wherein the instructions to determine the maximum transmission power for the uplink transmission are executable by the processor to cause the apparatus to:

determine to use a first maximum transmission power when an actual direction of communications with the third cell within the first frequency range is downlink; and determine to use a second maximum transmission power when the actual direction of communications with the third cell within the first frequency range is uplink or flexible, wherein the second maximum transmission power is different from the first maximum transmission power.

17. The apparatus of claim 16, wherein the second maximum transmission power is less than the first maximum transmission power.

18. The apparatus of claim 15, wherein the instructions to determine the maximum transmission power for the uplink transmission are executable by the processor to cause the apparatus to:

assume that the direction of communications with the third cell within the first frequency range is either uplink or flexible; and determine to use, as the maximum transmission power, a lesser of two selectable maximum transmission power values, based at least in part on the assumption.

19. The apparatus of claim 15, wherein the instructions are further executable by the processor to cause the apparatus to:

determine whether to use an actual direction or an assumed direction of communications with the third cell within the first frequency range in determining the maximum transmission power for the uplink transmission.

20. The apparatus of claim 15, wherein the instructions are further executable by the processor to cause the apparatus to:

receive an additional uplink grant scheduling an additional uplink transmission on the second cell within the second frequency range; and determine an additional transmission power for the additional uplink transmission based at least in part on a direction of communications with a fourth cell of the second cell group within the second frequency range but not within the first frequency range.

21. The apparatus of claim 20, wherein the uplink grant and the additional uplink grant are received on the first cell and the second cell, respectively, and wherein the maximum transmission power and the additional transmission power are each determined based at least in part on the direction of communications within respective frequency ranges.

22. The apparatus of claim 20, wherein the uplink grant and the additional uplink grant are received jointly on the first cell and with a carrier indication field to indicate which component carrier each of the uplink grant and the additional uplink grant pertain, and wherein the maximum transmission power and the additional transmission power are each determined based at least in part on the direction of communications within respective frequency ranges.

23. The apparatus of claim 15, wherein the instructions are further executable by the processor to cause the apparatus to:

identify that cross-carrier scheduling across cells in different frequency ranges is configured, such that the uplink grant is received on a component carrier within the second frequency range, while the uplink transmission is scheduled within the first frequency range; and determine to use, as the maximum transmission power, a lesser of two selectable maximum transmission power values, based at least in part on cross-carrier scheduling across cells in different frequency ranges being configured.

24. The apparatus of claim 23, wherein the determination to use the lesser of the two selectable maximum transmission power values is based on an assumed direction of communications with the third cell within the first frequency range.

25. The apparatus of claim 23, wherein the instructions to determine to use, as the maximum transmission power, the lesser of the two selectable maximum transmission power values further are executable by the processor to cause the apparatus to:

identify that the uplink grant is received via a downlink control information message; and determine to use the lesser of the two selectable maximum transmission power values as the maximum transmission power based on both the uplink grant being received via the downlink control information message and on cross-carrier scheduling across cells in different frequency ranges being configured.

26. The apparatus of claim 23, wherein the instructions to determine to use, as the maximum transmission power, the lesser of the two selectable maximum transmission power values further are executable by the processor to cause the apparatus to:

identify that the uplink grant is received via a downlink control information message of format 0_1 with a carrier indication field; and determine to use the lesser of the two selectable maximum transmission power values as the maximum transmission power based on both the uplink grant being received via the downlink control information message having format 0_1 and the carrier indication field and on cross-carrier scheduling across cells in different frequency ranges being configured.

27. The apparatus of claim 15, wherein the instructions are further executable by the processor to cause the apparatus to:

determine an actual direction based at least in part on a semi-static time domain duplexing configuration, a synchronization signal/physical broadcast channel block measurement time configuration window, a downlink channel monitoring occasion configuration, a downlink semi-persistent scheduling configuration, medium access control information, or a combination thereof.

28. The apparatus of claim 15, wherein the direction comprises an uplink, downlink, or flexible transmission direction.

29. An apparatus for wireless communications at a user equipment (UE), comprising:

means for identifying that the UE is configured with more than one cell group, with a first cell group having a first cell operating within a first frequency range and a second cell operating with a second frequency range, and with a second cell group having at least a third cell operating within the first frequency range;

means for receiving an uplink grant scheduling an uplink transmission on the first cell during a symbol and within the first frequency range;

means for determining a maximum transmission power for the uplink transmission based at least in part on a direction of communications with the third cell during a duration of the symbol and within a frequency range that includes the first frequency range and is exclusive of the second frequency range; and means for transmitting the uplink transmission on the first cell of the first cell group within the first frequency range in accordance with the maximum transmission power.

30. A non-transitory computer-readable medium storing code for wireless communications at a user equipment (UE), the code comprising instructions executable by a processor to:

identify that the UE is configured with more than one cell group, with a first cell group having a first cell operating within a first frequency range and a second cell operating with a second frequency range, and with a second cell group having at least a third cell operating within the first frequency range;

receive an uplink grant scheduling an uplink transmission on the first cell during a symbol and within the first frequency range;

determine a maximum transmission power for the uplink transmission based at least in part on a direction of communications with the third cell during a duration of the symbol and within a frequency range that includes the first frequency range and is exclusive of the second frequency range; and transmit the uplink transmission on the first cell of the first cell group within the first frequency range in accordance with the maximum transmission power.

* * * * *